(12) United States Patent
Hashii et al.

(10) Patent No.: US 9,846,681 B2
(45) Date of Patent: Dec. 19, 2017

(54) APPARATUS AND METHOD FOR OUTPUTTING LAYOUT IMAGE

(71) Applicant: CANON KABUSHIKI KAISHA, Tokyo (JP)

(72) Inventors: Yusuke Hashii, Tokyo (JP); Kiyoshi Umeda, Kawasaki (JP); Hiroyasu Kunieda, Yokohama (JP); Hiroyuki Sakai, Chigasaki (JP); Naoki Sumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 318 days.

(21) Appl. No.: 13/934,720

(22) Filed: Jul. 3, 2013

(65) Prior Publication Data

US 2014/0013217 A1 Jan. 9, 2014

(30) Foreign Application Priority Data

Jul. 9, 2012 (JP) .................................. 2012-153781

(51) Int. Cl.
*G06F 17/00* (2006.01)
*G06F 17/21* (2006.01)
*G06F 17/30* (2006.01)

(52) U.S. Cl.
CPC ........ *G06F 17/212* (2013.01); *G06F 17/3089* (2013.01)

(58) Field of Classification Search
CPC ...... G06F 17/25; G06F 17/211; G06F 17/212; G06F 17/3089
See application file for complete search history.

(56) References Cited

U.S. PATENT DOCUMENTS

| | | | |
|---|---|---|---|
| 5,873,106 A * | 2/1999 | Joseph .......................... | 715/203 |
| 6,826,727 B1 * | 11/2004 | Mohr et al. ................... | 715/235 |
| 7,236,632 B2 * | 6/2007 | Erol et al. ..................... | 382/218 |
| 7,930,647 B2 * | 4/2011 | Skrenta ......................... | 715/788 |
| 2002/0122067 A1 * | 9/2002 | Geigel .............. | G06F 17/30265 |
| | | | 715/788 |
| 2003/0074373 A1 * | 4/2003 | Kaburagi .......... | G06F 17/30265 |

(Continued)

FOREIGN PATENT DOCUMENTS

| | | |
|---|---|---|
| JP | 5-197793 A | 8/1993 |
| JP | 8-63597 A | 3/1996 |

(Continued)

*Primary Examiner* — Laurie Ries
(74) *Attorney, Agent, or Firm* — Canon USA, Inc. I.P. Division

(57) ABSTRACT

An apparatus includes an acquisition unit configured to acquire an image group including a plurality of images, a specifying unit configured to specify feature information of each of the images, a generation unit configured to generate a plurality of layout candidates by arranging images selected from the acquired image group, an evaluation unit configured to evaluate each of the layout candidates generated by the generation unit based on a plurality of evaluation standards including an image evaluation based on the feature information of each image arranged in the layout candidate and an overall evaluation of the layout candidate, and a determination unit configured to select and determine a layout to be output from the plurality of layout candidates based on a result of evaluation by the evaluation unit.

21 Claims, 28 Drawing Sheets

(56) References Cited

U.S. PATENT DOCUMENTS

| | | | | |
|---|---|---|---|---|
| 2004/0080670 | A1* | 4/2004 | Cheatle | H04N 1/3872 348/441 |
| 2005/0091599 | A1* | 4/2005 | Yamakado | G06F 3/0481 715/732 |
| 2005/0210019 | A1* | 9/2005 | Uehara | G06F 17/30256 |
| 2006/0274978 | A1* | 12/2006 | Fukuda | G06F 17/30265 382/305 |
| 2007/0043623 | A1* | 2/2007 | Kodama | G06Q 40/02 705/22 |
| 2007/0253028 | A1* | 11/2007 | Widdowson | G06T 11/60 358/1.18 |
| 2008/0028298 | A1* | 1/2008 | Kaneko | G06T 11/60 715/243 |
| 2009/0116752 | A1* | 5/2009 | Isomura | G06F 17/30265 382/217 |
| 2009/0220159 | A1* | 9/2009 | Tanaka | G06K 9/00248 382/203 |
| 2009/0327875 | A1* | 12/2009 | Kinkoh | G06F 17/248 715/255 |
| 2010/0083128 | A1* | 4/2010 | Kon | G06F 3/0482 715/741 |
| 2010/0180213 | A1* | 7/2010 | Karageorgos | G06F 17/30011 715/753 |
| 2010/0239176 | A1* | 9/2010 | Yamakado | G06T 11/60 382/224 |
| 2010/0302595 | A1* | 12/2010 | Yamada | G06K 9/4642 358/1.18 |
| 2011/0060979 | A1* | 3/2011 | O'Brien-Strain | G09G 5/14 715/204 |
| 2011/0085728 | A1* | 4/2011 | Gao | G06K 9/4671 382/165 |
| 2012/0179995 | A1* | 7/2012 | Cok | H04N 1/00196 715/810 |
| 2013/0004073 | A1* | 1/2013 | Yamaji | G06T 11/60 382/173 |
| 2013/0159924 | A1* | 6/2013 | Yates | G06T 11/00 715/790 |
| 2013/0246925 | A1* | 9/2013 | Ahuja | H04L 63/20 715/738 |

FOREIGN PATENT DOCUMENTS

| | | |
|---|---|---|
| JP | 8-77334 A | 3/1996 |
| JP | 2541688 B2 | 10/1996 |
| JP | 3469031 B2 | 9/1998 |
| JP | 11-53525 A | 2/1999 |
| JP | 11-250267 A | 9/1999 |
| JP | 2000-105829 A | 4/2000 |
| JP | 2000-132688 A | 5/2000 |
| JP | 2000-235648 A | 8/2000 |
| JP | 2001-216515 A | 8/2001 |
| JP | 2002-183731 A | 6/2002 |
| JP | 2003-30667 A | 1/2003 |
| JP | 2003-030673 A | 1/2003 |
| JP | 2005-333655 A | 12/2005 |
| JP | 2006-287917 A | 10/2006 |
| JP | 2010-251999 A | 11/2010 |
| JP | 2010-273144 A | 12/2010 |

* cited by examiner

FIG. 8B

| | | | | | 1 | 2 |
|---|---|---|---|---|---|---|
| 3 | 4 | 5 | 6 | 7 | 8 | 9 |
| 10 | 11 | 12 | 13 | 14 | ☐ | 16 |
| 17 | 18 | 19 | 20 | 21 | 22 | 23 |
| 24 | 25 | 26 | ☐ | 28 | 29 | 30 |
| 31 | | | | | | |

| | 1 | 2 | 3 | 4 | 5 | 6 |
|---|---|---|---|---|---|---|
| 7 | 8 | 9 | 10 | 11 | 12 | 13 |
| 14 | 15 | 16 | 17 | 18 | 19 | 20 |

```
<?xml version="1.0" encoding="utf-8"? >
<IMAGEINFO>
        <BaseInfo>
                <ID>0x00000001</ID>
                <ImagePath>C:¥My Picture¥IMG0001.jpg</ImagePath>
                <ImageSize width=3000, height=2000 />
                <CaptureDateTime>20100101:120000<CaptureDateTime>
        </BaseInfo>
        <SensInfo>
                <AveY>122</AveY>
                <AveS>38</AveS>
                <AveH>50</AveH>
                <SceneType>Landscape</SceneType>
                <Person>
                        <ID>0</ID>
                        <Position>
                                <LeftTop x=420, y=200/>
                                <LeftBottom x=420, y=300/>
                                <RightTop x=520, y=200/>
                                <RightBottom x=520, y=300/>
                        </Position>
                        <AveY>128</AveY>
                        <AveCb>-20</AveCb>
                        <AveCr>20</AveCr>
                </Person>
                . . .
        </SensInfo>
        <UserInfo>
                <FavoriteRate>3</FavoriteRate>
                <ViewingTimes>5</ViewingTimes>
                <PrintingTimes>3</PrintingTimes>
                <Event>Travel</Event>
        </UserInfo>
        . . .
</IMAGEINFO>
```

FIG. 12

```
<?xml version="1.0" encoding="utf-8" ?>
<PERSONINFO>
        <ID>0</ID>
        <Name>father</Name>
        <Birthday>19700101</Birthday>
        <Relationship>father</Relationship>
</PERSONINFO>
<PERSONINFO>
        <ID>1</ID>
        <Name>son</Name>
        <Birthday>20000101</Birthday>
        <Relationship>son</Relationship>
</PERSONINFO>

```xml
<?xml version="1.0" encoding="utf-8" ?>
<LayoutInfo>
    <BASIC>
        <Theme></Theme>
        <PageSize>A4</PageSize>
        <Resolution>300</Resolution>
    </BASIC>
    <ImageSlot>
        <ID>0</ID>
        <POSITION>
            <LeftTop x=100, y=200/>
            <LeftBottom x=100, y=800/>
            <RightTop x=1000, y=200/>
            <RightBottom x=1000, y=800/>
        </POSITION>
        <Shape>Rectangle</Shape>
        <PersonGroup>MainGroup</PersonGroup>
    </ImageSlot>
    <ImageSlot>
        <ID>1</ID>
        <POSITION>
            <LeftTop x=800, y=700/>
            <LeftBottom x=800, y=1500/>
            <RightTop x=1700, y=700/>
            <RightBottom x=1700, y=1500/>
        </POSITION>
        <Shape>Rectangle</Shape>
        <PersonGroup>MainGroup</PersonGroup>
    </ImageSlot>
    <ImageSlot>
        <ID>2</ID>
        <POSITION>
            <LeftTop x=300, y=1700/>
            <LeftBottom x=300, y=2300/>
            <RightTop x=1200, y=1700/>
            <RightBottom x=1200, y=2300/>
        </POSITION>
        <Shape>Rectangle</Shape>
        <PersonGroup>MainGroup</PersonGroup>
    </ImageSlot>
</LayoutInfo>
```

FIG. 16

```xml
<?xml version="1.0" encoding="utf-8" ?>
<LayoutInfo>
        <BASIC>
                <Theme></Theme>
                <PageSize>A4</PageSize>
                <Resolution>300</Resolution>
        </BASIC>
        <ImageSlot>
                <ID>0</ID>
                <POSITION>
                        <LeftTop x=400, y=900/>
                        <LeftBottom x=400, y=1500/>
                        <RightTop x=1300, y=900/>
                        <RightBottom x=1300, y=1500/>
                </POSITION>
                <Shape>Rectangle</Shape>
                <PersonGroup>SubGroup</PersonGroup>
        </ImageSlot>
        <ImageSlot>
                <ID>1</ID>
                <POSITION>
                        <LeftTop x=700, y=100/>
                        <LeftBottom x=700, y=500/>
                        <RightTop x=1100, y=100/>
                        <RightBottom x=1100, y=500/>
                </POSITION>
                <Shape>ellipse</Shape>
                <PersonGroup>MainGroup</PersonGroup>
        </ImageSlot>
        <ImageSlot>
                <ID>2</ID>
                <POSITION>
                        <LeftTop x=1100, y=200/>
                        <LeftBottom x=1100, y=600/>
                        <RightTop x=1450, y=200/>
                        <RightBottom x=1450, y=600/>
                </POSITION>
                <Shape>ellipse</Shape>
                <PersonGroup>MainGroup</PersonGroup>
        </ImageSlot>

. . . . . . .

</LayoutInfo>
```

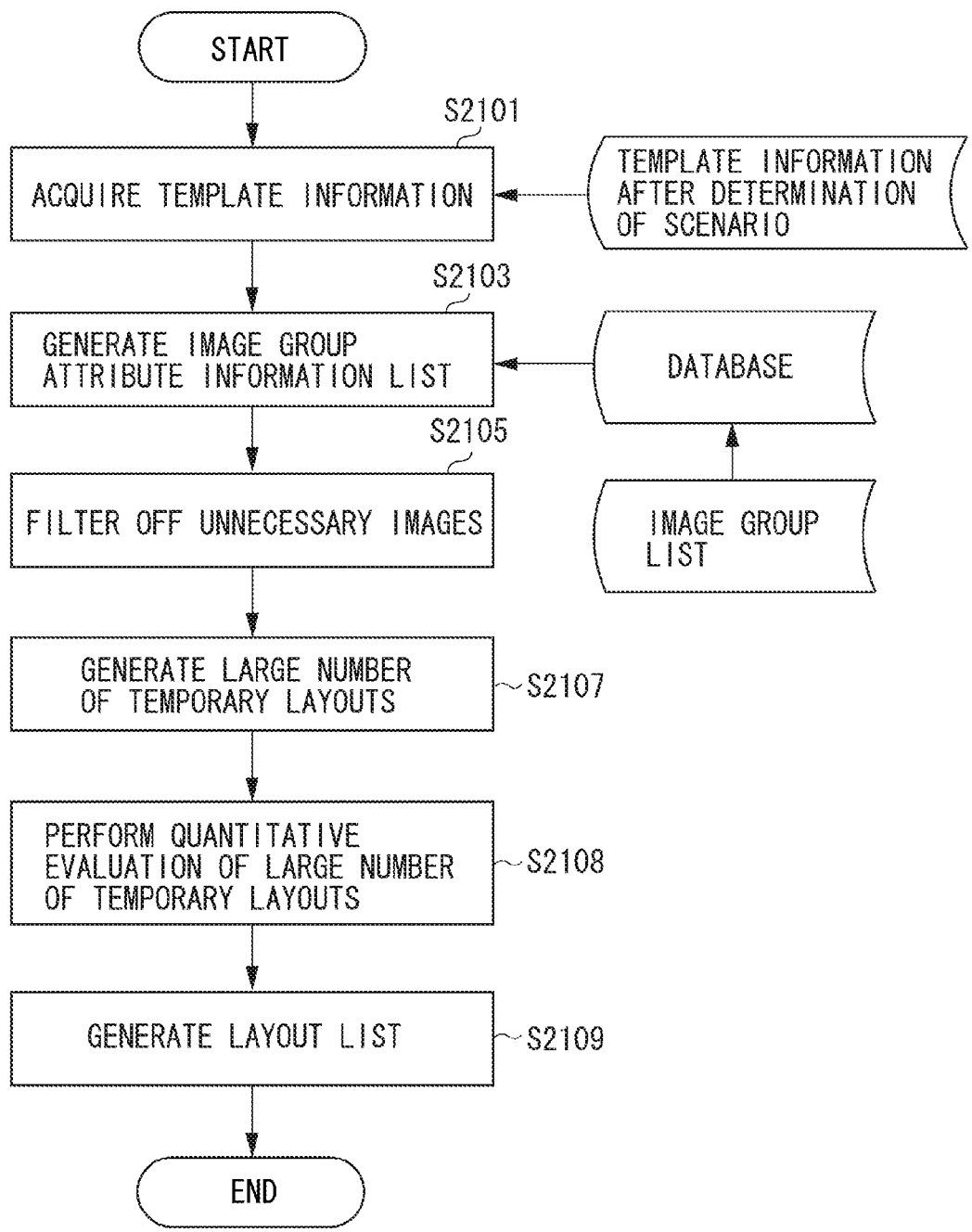

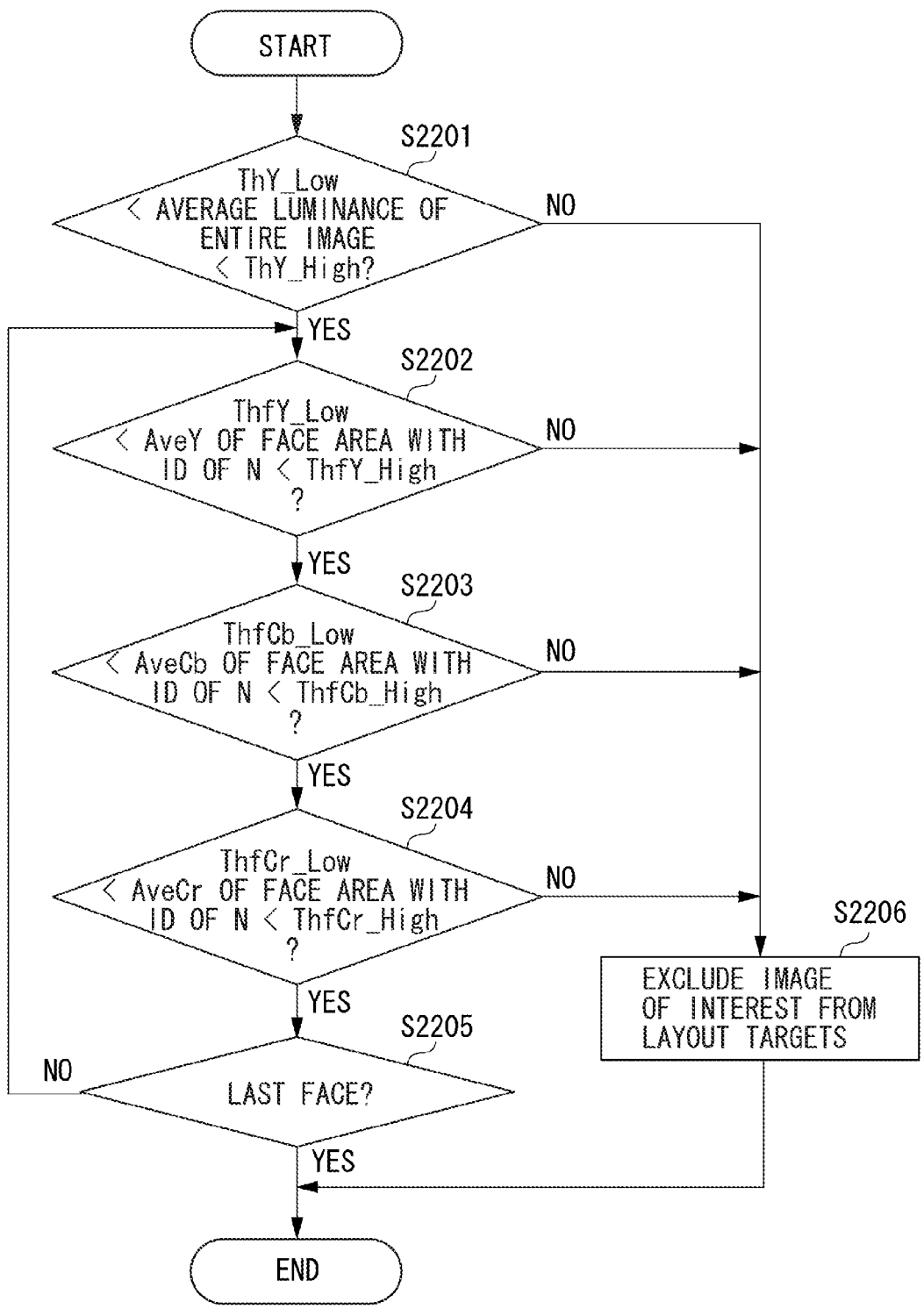

FIG. 22

```xml
<?xml version="1.0" encoding="utf-8" ?>
<LayoutInfo>
        <BASIC>
                <Theme>growth</Theme>
                <PageSize>A4</PageSize>
                <Resolution>300</Resolution>
                <MainGroup>son</MainGroup>
                <SubGroup>son, father</SubGroup>
        </BASIC>
        <ImageSlot>
                <ID>0</ID>
                <POSITION>
                        <LeftTop x=400, y=900/>
                        <LeftBottom x=400, y=1500/>
                        <RightTop x=1300, y=900/>
                        <RightBottom x=1300, y=1500/>
                </POSITION>
                <Shape>Rectangle</Shape>
                <PersonGroup>SubGroup</PersonGroup>
        </ImageSlot>
        <ImageSlot>
                <ID>1</ID>
                <POSITION>
                        <LeftTop x=700, y=100/>
                        <LeftBottom x=700, y=500/>
                        <RightTop x=1100, y=100/>
                        <RightBottom x=1100, y=500/>
                </POSITION>
                <Shape>ellipse</Shape>
                <PersonGroup>MainGroup</PersonGroup>
        </ImageSlot>
        <ImageSlot>
                <ID>2</ID>
                <POSITION>
                        <LeftTop x=1100, y=200/>
                        <LeftBottom x=1100, y=600/>
                        <RightTop x=1450, y=200/>
                        <RightBottom x=1450, y=600/>
                </POSITION>
                <Shape>ellipse</Shape>
                <PersonGroup>MainGroup</PersonGroup>
        </ImageSlot>
          . . . . . . .
</LayoutInfo>
```

FIG. 23

```xml
<?xml version="1.0" encoding="utf-8" ?>
<LayoutInfo>
    <BASIC>
        <Theme>travel</Theme>
        <PageSize>A4</PageSize>
        <Resolution>300</Resolution>
        <MainGroup>son, mother, father</MainGroup>
    </BASIC>
    <ImageSlot>
        <ID>0</ID>
        <POSITION>
            <LeftTop x=100, y=200/>
            <LeftBottom x=100, y=800/>
            <RightTop x=1000, y=200/>
            <RightBottom x=1000, y=800/>
        </POSITION>
        <Shape>Rectangle</Shape>
        <PersonGroup>MainGroup</PersonGroup>
    </ImageSlot>
    <ImageSlot>
        <ID>1</ID>
        <POSITION>
            <LeftTop x=800, y=700/>
            <LeftBottom x=800, y=1500/>
            <RightTop x=1700, y=700/>
            <RightBottom x=1700, y=1500/>
        </POSITION>
        <Shape>Rectangle</Shape>
        <PersonGroup>MainGroup</PersonGroup>
    </ImageSlot>
    <ImageSlot>
        <ID>2</ID>
        <POSITION>
            <LeftTop x=300, y=1700/>
            <LeftBottom x=300, y=2300/>
            <RightTop x=1200, y=1700/>
            <RightBottom x=1200, y=2300/>
        </POSITION>
        <Shape>Rectangle</Shape>
        <PersonGroup>MainGroup</PersonGroup>
    </ImageSlot>
</LayoutInfo>
```

FIG. 24

```xml
<?xml version="1.0" encoding="utf-8" ?>
<LayoutInfo>
        <BASIC>
                <Theme>growth</Theme>
                <PageSize>A4</PageSize>
                <Resolution>300</Resolution>
                <MainGroup>son</MainGroup>
                <SubGroup>son, father</SubGroup>
        </BASIC>
        <ImageSlot>
                <ID>0</ID>
                <POSITION>
                        <LeftTop x=400, y=900/>
                        <LeftBottom x=400, y=1500/>
                        <RightTop x=1300, y=900/>
                        <RightBottom x=1300, y=1500/>
                </POSITION>
                <Shape>Rectangle</Shape>
                <PersonGroup>SubGroup</PersonGroup>
                <ImageID>0x00000001</ImageID>
                <TrimmingRatio>50.0</TrimmingRatio>
        </ImageSlot>
        <ImageSlot>
                <ID>1</ID>
                <POSITION>
                        <LeftTop x=700, y=100/>
                        <LeftBottom x=700, y=500/>
                        <RightTop x=1100, y=100/>
                        <RightBottom x=1100, y=500/>
                </POSITION>
                <Shape>ellipse</Shape>
                <PersonGroup>MainGroup</PersonGroup>
                <ImageID>0x00000089</ImageID>
                <TrimmingRatio>38.0</TrimmingRatio>
        <ImageSlot>
                <ID>2</ID>
                <POSITION>
                        <LeftTop x=1100, y=200/>
                        <LeftBottom x=1100, y=600/>
                        <RightTop x=1450, y=200/>
                        <RightBottom x=1450, y=600/>
                </POSITION>
                <Shape>ellipse</Shape>
                <PersonGroup>MainGroup</PersonGroup>
                <ImageID>0x00000129</ImageID>
                <TrimmingRatio>53.0</TrimmingRatio>
        </ImageSlot>
          . . . . . . .
</LayoutInfo>
```

APPARATUS AND METHOD FOR OUTPUTTING LAYOUT IMAGE

BACKGROUND OF THE INVENTION

Field of the Invention

The present invention relates to an apparatus and a method for outputting a layout image.

Description of the Related Art

Methods for generating various products such as a collage and an album by using pictures captured by a digital camera have been known. Japanese Patent Application Laid-Open No. 2006-287917 discusses an image output method that includes identifying orientations of objects included in images, laying out the images based on the identified orientations of the objects, and outputting the laid-out images.

According to the method discussed in Japanese Patent Application Laid-Open No. 2006-287917, the generated layout exactly follows instructions of a template. Such a method for extracting an image group matching a template has had the problem that a favorable layout reflecting features of the image group is not able to be generated.

SUMMARY OF THE INVENTION

The present invention is directed to an image processing apparatus and an image processing method which can obtain a high-quality layout result in favorable overall alignment according to an image group.

According to an aspect of the present invention, an apparatus includes an acquisition unit configured to acquire an image group including a plurality of images, a specifying unit configured to specify feature information of each of the images, a generation unit configured to generate a plurality of layout candidates by arranging images selected from the acquired image group, an evaluation unit configured to evaluate each of the layout candidates generated by the generation unit based on a plurality of evaluation standards including an image evaluation based on the feature information of each image arranged in the layout candidate and an overall evaluation of the layout candidate, and a determination unit configured to select and determine a layout to be output from the plurality of layout candidates based on a result of evaluation by the evaluation unit.

Further features of the present invention will become apparent from the following description of exemplary embodiments with reference to the attached drawings.

BRIEF DESCRIPTION OF THE DRAWINGS

FIGS. 8A and 8B illustrate display examples of an images group according to the first exemplary embodiment.

FIG. 9 illustrates an example of a format in which a result of image analysis is stored.

FIG. 12 illustrates an example of a format in which the person attribute information is stored.

FIG. 14 illustrates an example of a format in which the layout template of FIG. 13 is stored.

FIG. 16 illustrates an example of a format in which the layout template of FIG. 15 is stored.

FIG. 17 is a flowchart of automatic layout generation processing according to the first exemplary embodiment.

FIG. 18 is a flowchart of unnecessary image filtering processing according to the first exemplary embodiment.

FIG. 22 illustrates an example of how a determined theme and main character information are stored.

FIG. 23 illustrates an example of how a determined theme and main character information are stored.

FIG. 24 illustrates an example of how generated layout information is stored.

DESCRIPTION OF THE EMBODIMENTS

A first exemplary embodiment of the present invention for automatically generating a layout output product by using input image groups will be described below. The following description will only exemplify a mode of embodiment, and the present invention is not limited to the following exemplary embodiment.

Figure 1:
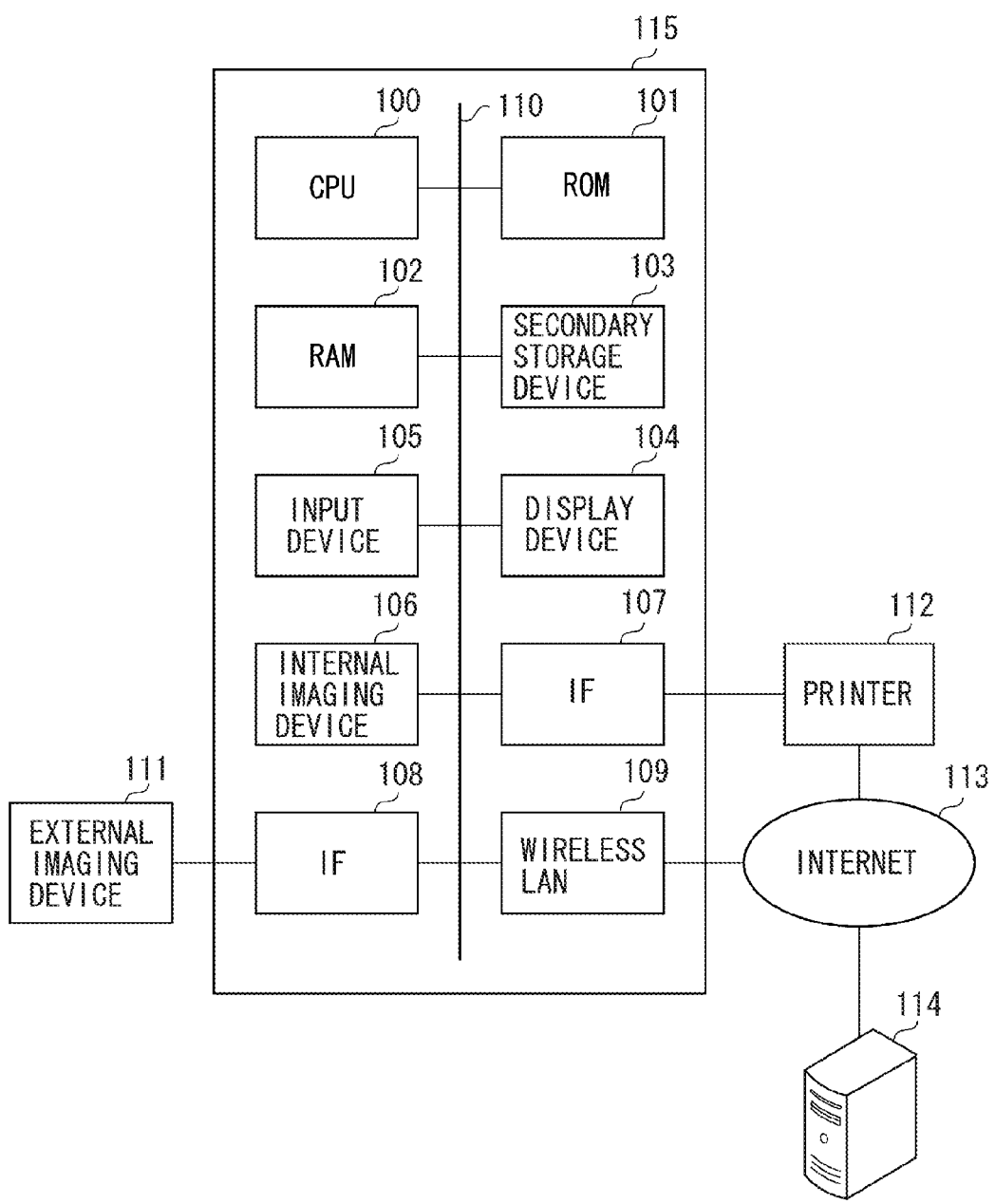
FIG. 1 is a hardware configuration diagram of an image processing apparatus according to a first exemplary embodiment.

FIG. 1 is a block diagram illustrating an example of a hardware configuration of an image processing apparatus according to the first exemplary embodiment.

In FIG. 1, an information processing apparatus 115 includes a central processing unit (CPU) 100, a read-only memory (ROM) 101, a random access memory (RAM) 102, a secondary storage device 103, a display device 104, an input device 105, an interface (IF) 107, an IF 108, and a wireless local area network (LAN) 109. The information processing apparatus 115 further includes an internal imaging device 106. Such components are connected to each other by a control bus/data bus 110. The information processing apparatus 115 of the present exemplary embodiment functions as an image processing apparatus.

An example of the information processing apparatus 115 is a computer. The CPU 100 performs information processing described in the first exemplary embodiment according to a program. The CPU 100 loads a program stored in the secondary storage device 103 and the like to a RAM 102 and runs the program on the RAM 102, thereby controlling of the entire image processing apparatus according to the present embodiment. The ROM 101 stores programs such as an application to be described below which is executed by the CPU 100. The RAM 102 provides a memory for temporarily storing various types of information when the CPU 100 executes a program. The secondary storage device 103 is a hard disk. The secondary storage medium 103 is a storage medium for storing image files and a database which stores image analysis results. An example of the display device 104 is a display. The display device 104 is a device for presenting a result of processing of the first exemplary embodiment and UIs to be described below to the user. The display device 104 may include a touch panel function. The input device 105 includes a mouse and/or a keyboard from which the user inputs an instruction for image correction processing.

Images captured by the internal imaging device 106 are subjected to predetermined image processing before stored into the secondary storage device 103. The information processing apparatus 115 can also read image data from an external imaging device 111 which is connected via an interface (IF 108). The wireless LAN 109 is connected to the Internet 113. The information processing apparatus 115 can also acquire image data from an external server 114 which is connected to the Internet 113.

A printer 112 for outputting images is connected to the information processing apparatus 115 via the IF 107. The printer 112 is further connected to the Internet 113 and can exchange print data with the information processing apparatus 115 via the wireless LAN 109.

Figure 2:
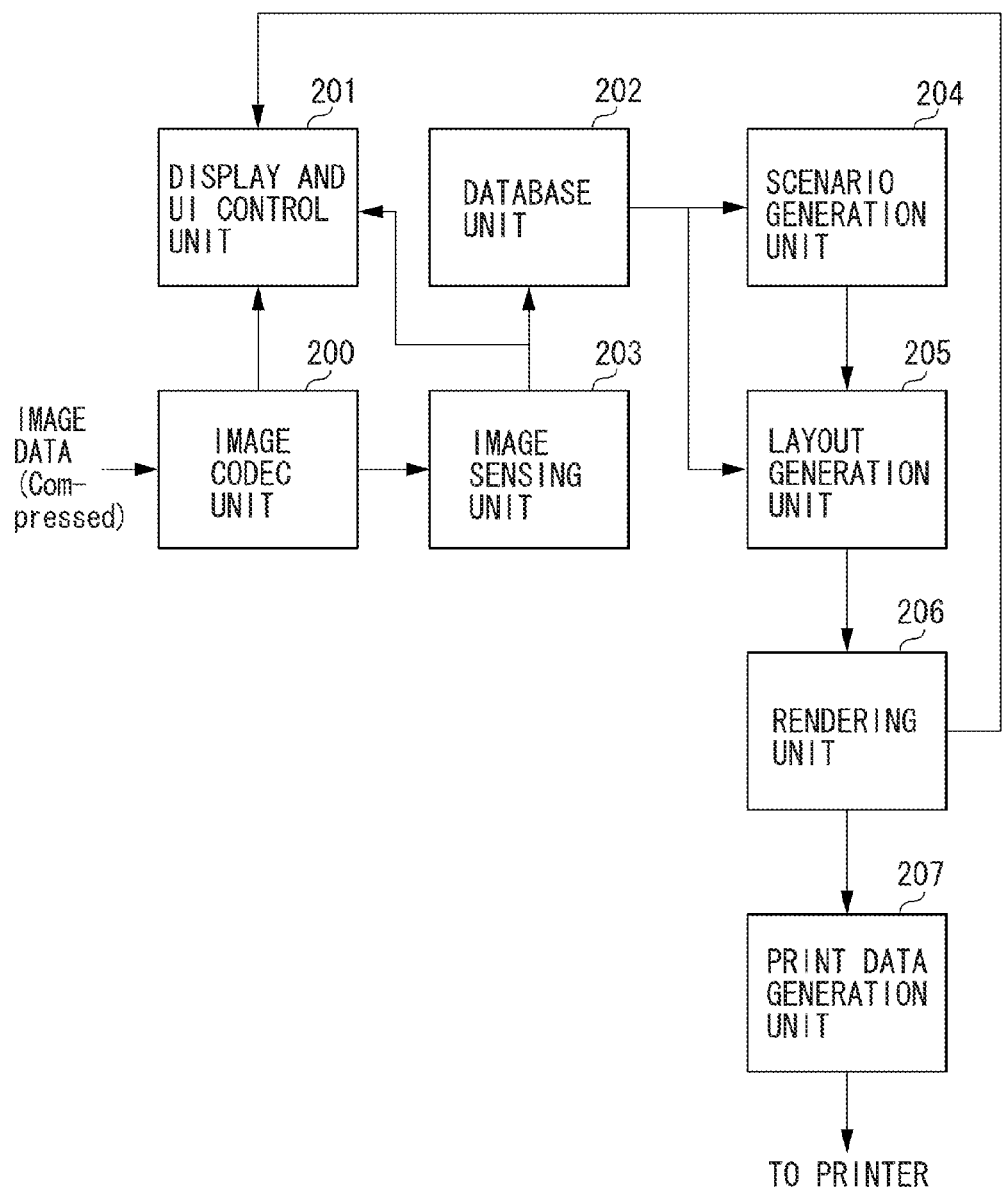
FIG. 2 is a software block diagram according to the first exemplary embodiment.

FIG. 2 is a block diagram illustrating a software configuration of the foregoing application according to the present exemplary embodiment.

Image data acquired by the information processing apparatus 115 is usually in a compression format such as Joint Photography Expert Group (JPEG). An image codec unit 200 decompresses and converts the compression format into a red, green, and blue (RGB) dot sequential bitmap data format. The converted bitmap data is transmitted to a display and UI control unit 201 and displayed on the display device 104 such as a display.

The bitmap data is further input to an image sensing unit 203 (application). As will be described in detail below, the image sensing unit 203 performs various types of analysis processing on images. A database unit 202 stores various types of attribute information about the images, obtained as a result of the analysis processing into the secondary storage device 103 in a predetermined format. In the following description, image analysis processing is synonymous with sensing processing.

A scenario generation unit 204 (application) generates conditions (scenario) of layouts to be automatically generated according to various conditions input by the user. A layout generation unit 205 (application) performs processing for automatically generating layouts according to the scenario.

Based on the generated layouts, a rendering unit 206 generates bitmap data for display. The bitmap data is transmitted to the display and UI control unit 201, and a result is displayed on the display device 104 such as a display. The rendering unit 206 further transmits a rendering result to a print data generation unit 207. The print data generation unit 207 converts the rendering result into printer command data, and transmits the printer command data to the printer 112.

Figure 3:
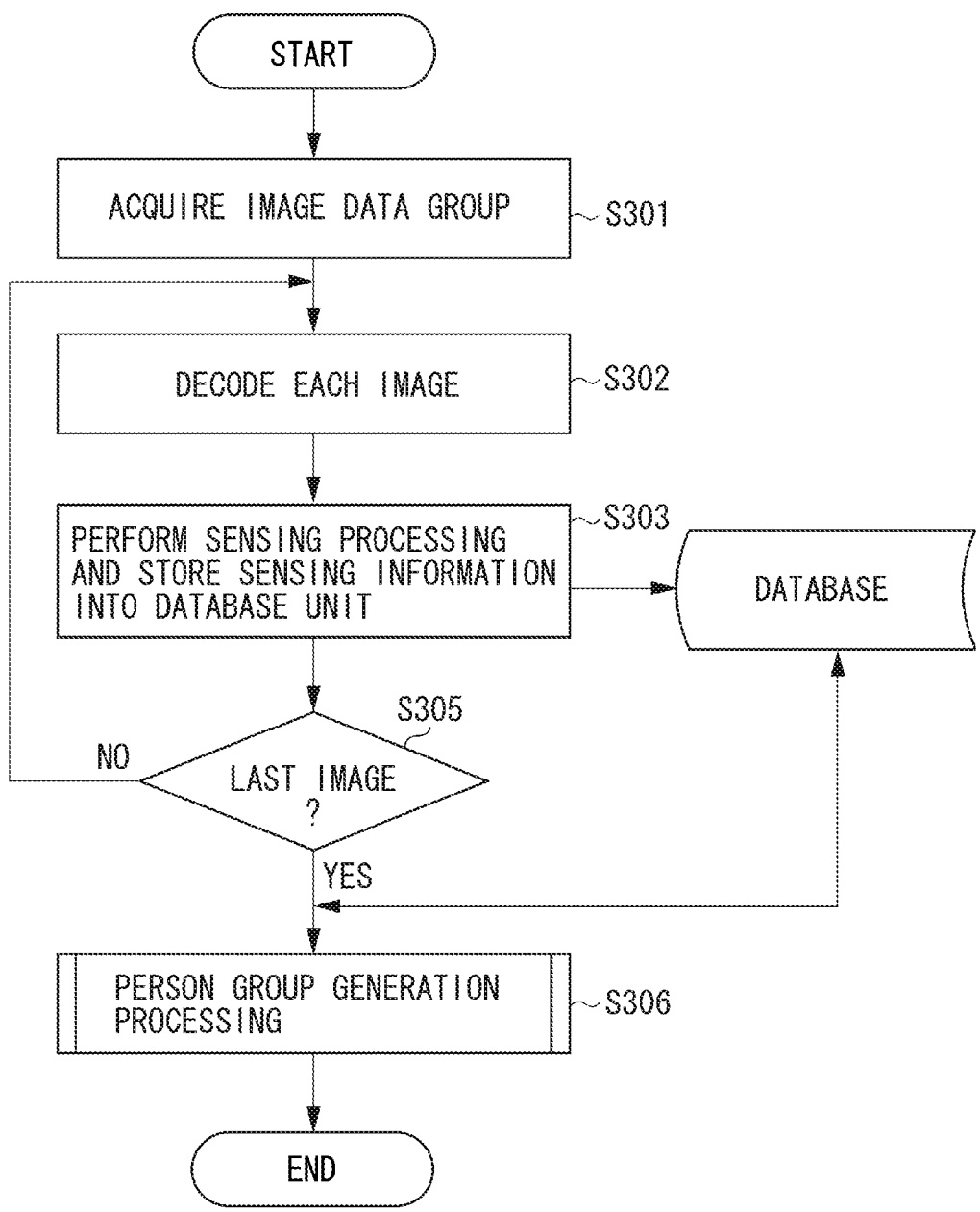
FIG. 3 is a flowchart of image analysis processing according to the first exemplary embodiment.
Figure 4:
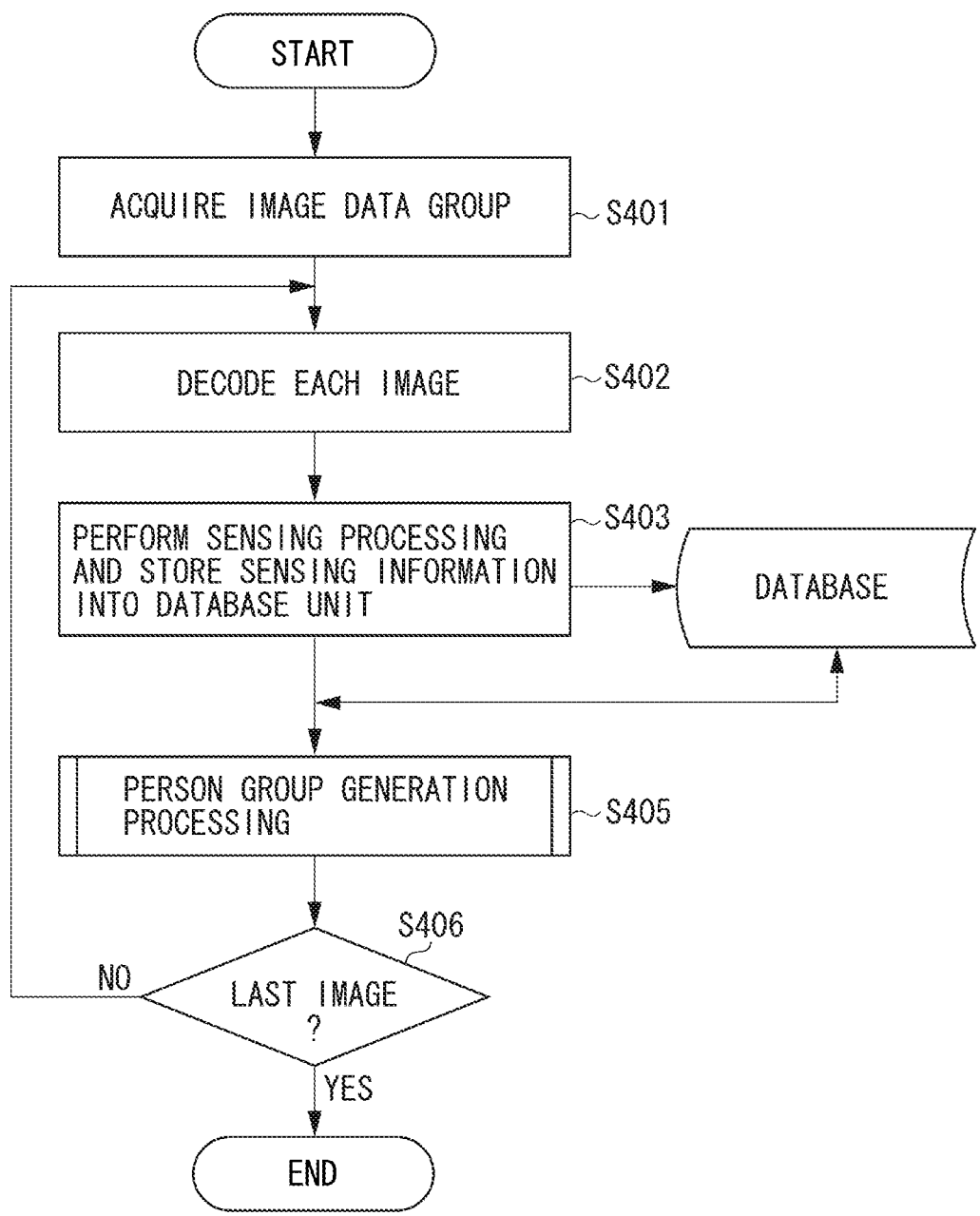
FIG. 4 is an alternate flowchart of image analysis processing according to the first exemplary embodiment.
Figure 5:
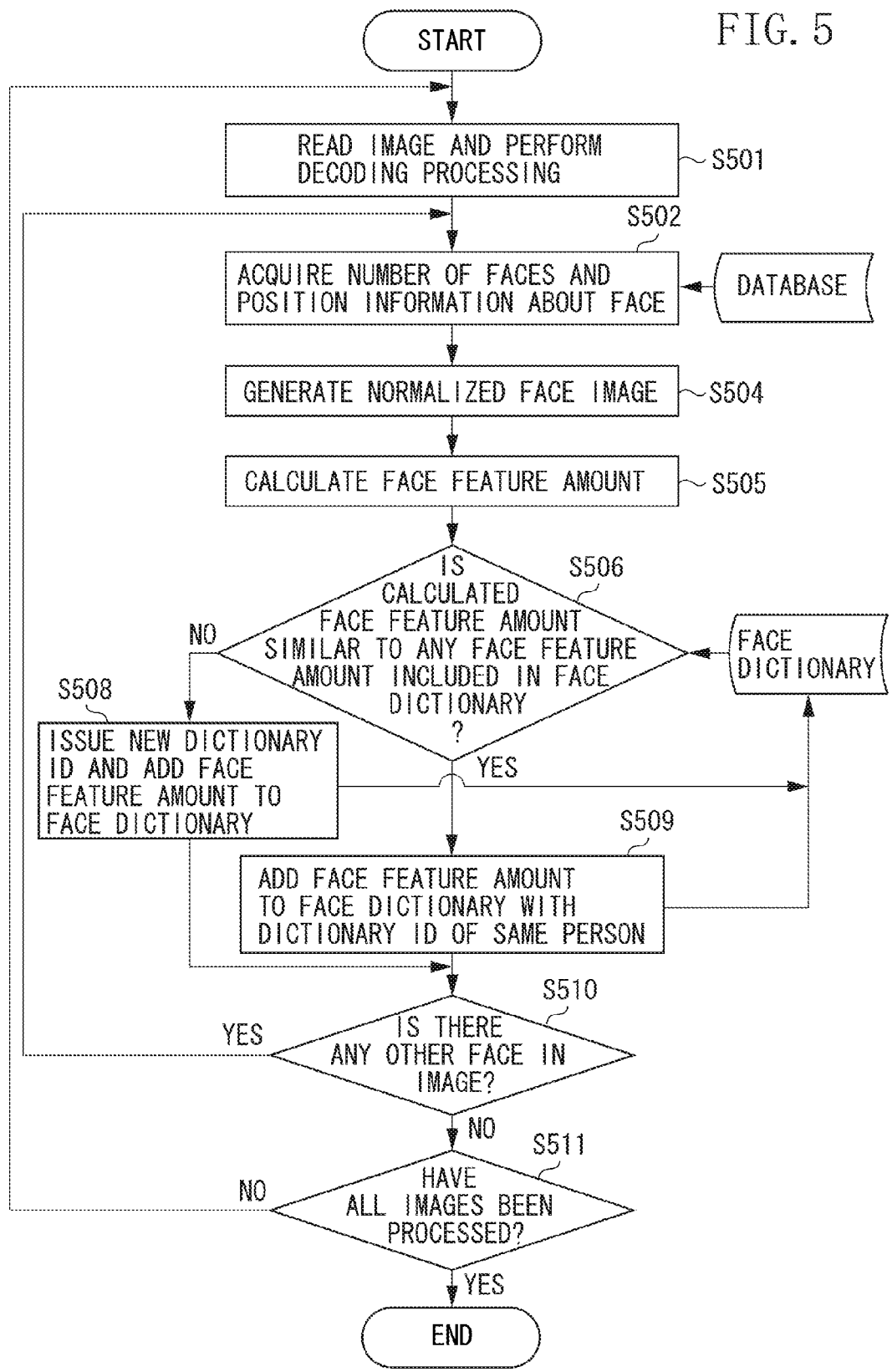
FIG. 5 is a flowchart of person group generation processing according to the first exemplary embodiment.
Figure 6:
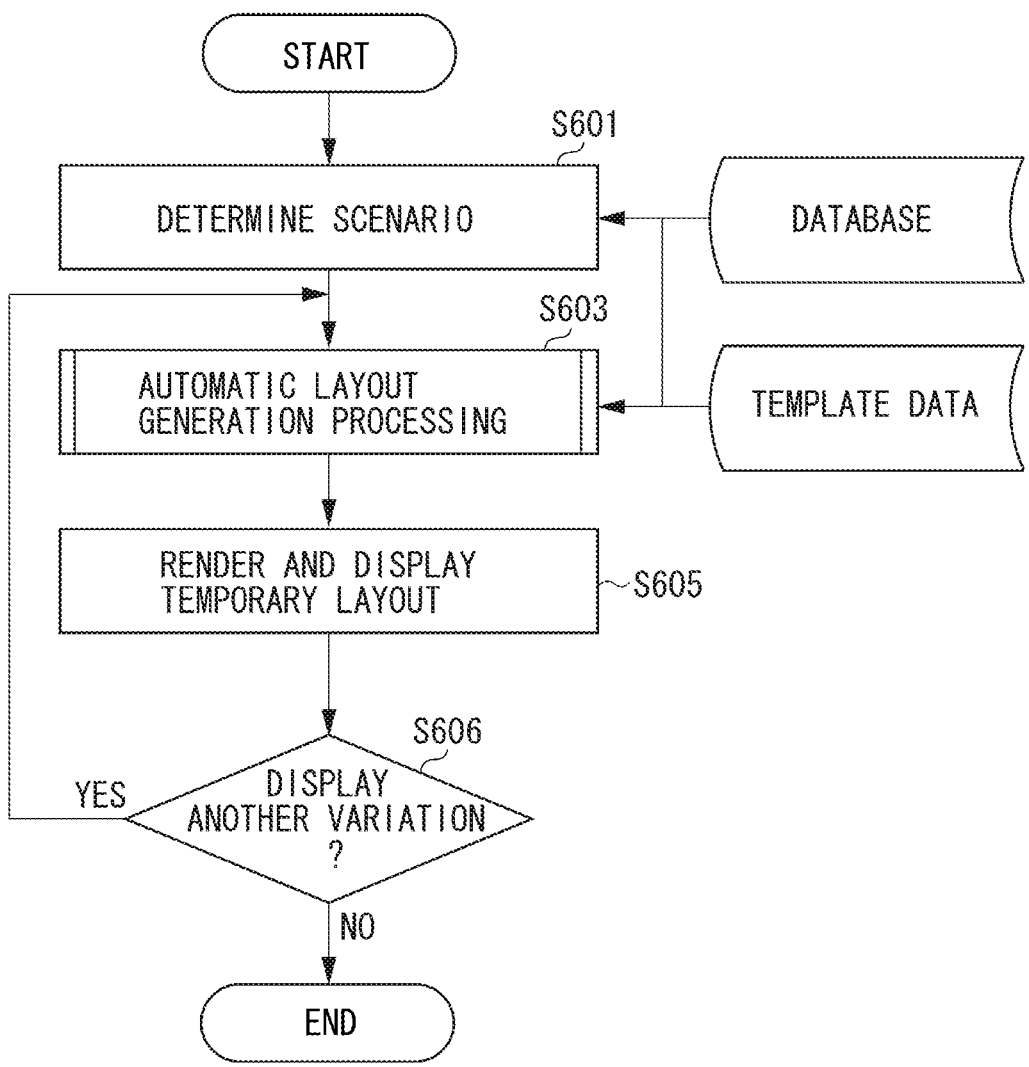
FIG. 6 is a flowchart of automatic layout suggestion processing according to the first exemplary embodiment.

FIGS. 3 to 6 are flowcharts illustrating basic image processing of the application according to the present exemplary embodiment. Specifically, FIGS. 3 and 4 illustrate a flow of the image sensing unit 203, i.e., a processing flow for acquiring a plurality of image data groups, applying analysis processing to each of the image data groups, and storing the result into the database unit 202. FIG. 5 illustrates a processing flow for grouping face information considered to be that of the same persons based on detected face position information. FIG. 6 illustrates a processing flow for determining a scenario for layout generation based on analysis information about images and various types of information input by the user, and automatically generating layouts based on the scenario.

In step S301 of FIG. 3, the image sensing unit 203 acquires an image data group. For example, the user may connect an image capturing apparatus or memory card containing captured images to the information processing apparatus 115, and the image sensing unit 203 may read the captured images from the image capturing apparatus or memory card to acquire an image data group. The image sensing unit 203 may acquire an image data group that has been captured by the internal imaging device 106 and stored in the secondary storage device 103. The image sensing unit 203 may acquire an image data group from a location other than the information processing apparatus 115, like the external server 114 connected to the Internet 113, via the wireless LAN 109.

Figure 8A:
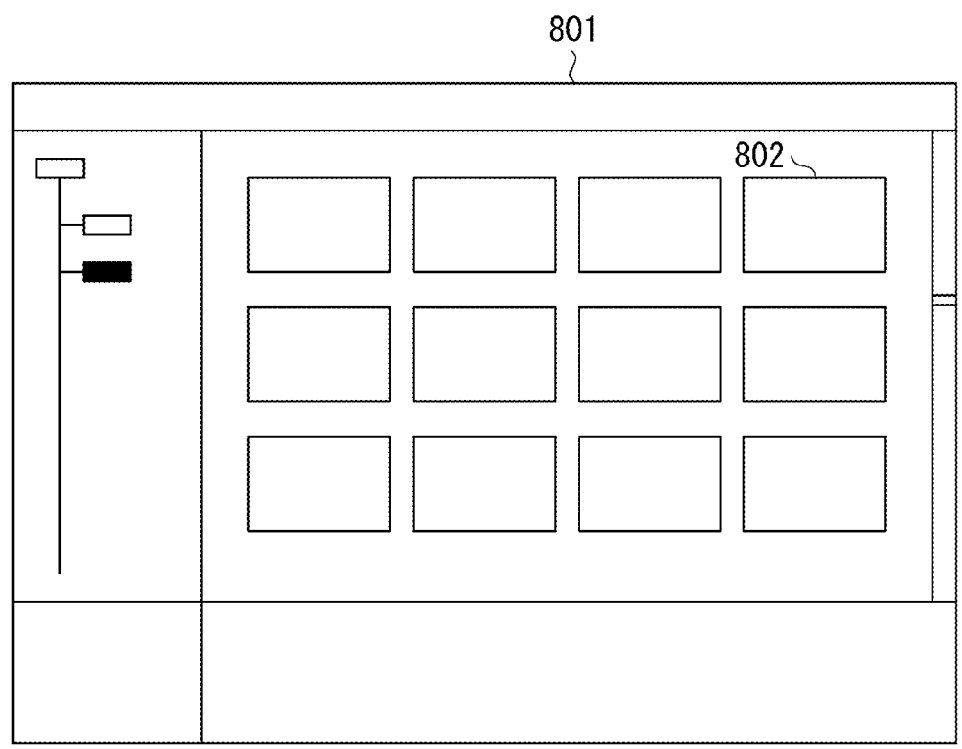

Acquiring the image data group, the image sensing unit 203 displays a thumbnail group of the image data group on a UI as illustrated in FIGS. 8A and 8B. As illustrated in FIG. 8A, the image sensing unit 203 may use a UI 801 to display thumbnails 802 of images in units of folders in the secondary storage device 103. As illustrated in FIG. 8B, the image sensing unit 203 may use a calendar-like UI 901 to manage image data by date. If the user clicks a date portion 902, the image sensing unit 203 displays images captured on that date in a thumbnail list form as illustrated in FIG. 8A.

In step S302, the image sensing unit 203 decodes each image. Specifically, the application searches for a new stored image on which sensing processing has not been performed yet. The image codec unit 200 converts each extracted image from compressed data into bitmap data.

In step S303, the image sensing unit 203 performs various types of sensing processing on the bitmap data. As employed herein, the sensing processing includes various types of processing listed in the following Table 1. In the present exemplary embodiment, examples of the sensing processing include face detection, a feature amount analysis of an image, and a scene analysis. Table 1 shows data types of respective calculation results.

TABLE 1

Examples of Attribute Information Obtained as a Result of Image Analysis

| Sensing category | Sensing subcategory | Data type | Value |
| --- | --- | --- | --- |
| Image basic feature amount | Average luminance | int | 0 to 255 |
|  | Average saturation | int | 0 to 255 |
|  | Average hue | int | 0 to 359 |
| Face detection | Number of human faces | int | 0 to MAXFACE |
|  | Coordinate positions | int * 8 | 0 to Width or Height |
|  | Average Y in face area | int | 0 to 255 |
|  | Average Cb face area | int | −128 to 127 |
|  | Average Cr face area | int | −128 to 127 |

TABLE 1-continued

Examples of Attribute Information Obtained
as a Result of Image Analysis

| Sensing category | Sensing subcategory | Data type | Value |
|---|---|---|---|
| Scene analysis | Scene result | char | Landscape<br>Nightscape<br>Portrait<br>Underexposure<br>Others |

Each type of sensing processing will be described below.

An overall average luminance and average saturation are basic feature information of an image such as feature amounts of an image, and can be determined by a known method. A detailed description thereof will be omitted. An average luminance can be determined by converting R, G, and B components of each pixel of an image into known luminance and color difference components (for example, Y, Cb, and Cr components; conversion equations are omitted) and averaging the Y components. An average saturation may be determined by calculating the following S of the Cb and Cr components of each pixel and averaging the calculations:

$$S = \sqrt{Cb^2 + Cr^2} \qquad \text{Eq. 1}$$

An average hue (AveH) in an image is a feature amount for evaluating a color tone of the image. The hue of each pixel can be determined by using known hue, intensity, and saturation (HIS) conversion equations. The hues of the entire image can be averaged to determine AveH.

The image sensing unit 203 may calculate such feature amounts of the entire image as described above. The image sensing unit 203 may divide an image into areas of predetermined size, and calculate the feature amounts of each area.

Next, human face detection processing will be described. In the present exemplary embodiment, the image sensing unit 203 may use known techniques for human face detection.

Japanese Patent Application Laid-Open No. 2002-183731 discusses a method that includes detecting an eye area from an input image and assuming a periphery of the eye area as a face candidate area. In the face candidate area, luminance gradients and weights of the luminance gradients are calculated pixel by pixel. The resulting values are compared with gradients and weights of the gradients of an ideal face reference image which is set in advance. If an average angle between the gradients is smaller than or equal to a predetermined threshold, the input image is determined to include a face area.

A method discussed in Japanese Patent Application Laid-Open No. 2003-30667 includes initially detecting a skin color area in an image, and detecting pixels of human iris color in the skin color area to detect eye positions.

A method discussed in Japanese Patent Application Laid-Open No. 8-63597 includes initially calculating matching rates between a plurality of face-shaped templates and an image. A template having the highest matching rate is selected. If the highest matching rate is higher than or equal to a predetermined threshold, the area inside the selected template is set as a face candidate area. The same template can be used to detect eye positions.

In a method discussed in Japanese Patent Application Laid-Open No. 2000-105829, an entire image or a designated area in the image is scanned by using a nose image pattern as a template, and a closest matching position is output as a nose position. Assuming an area above the nose position in the image as an area where eyes exist, the eye-existing area is scanned for matching by using an eye image pattern as a template. This determines an eye existence candidate position set which is a set of pixels where the matching rate is higher than a threshold. Continuous areas included in the eye existence candidate position set are divided into clusters. Distances between the respective clusters and the nose position are calculated. A cluster that minimizes the distance is determined to be a cluster where eyes exist, whereby organ positions can be detected.

Other examples of human face detection methods may include methods for detecting a face or organ position or positions discussed in Japanese Patent Application Laid-Open No. 8-77334, Japanese Patent Application Laid-Open No. 2001-216515, Japanese Patent Application Laid-Open No. 5-197793, Japanese Patent Application Laid-Open No. 11-53525, Japanese Patent Application Laid-Open No. 2000-132688, Japanese Patent Application Laid-Open No. 2000-235648, and Japanese Patent Application Laid-Open No. 11-250267. The human face detection processing may also be performed by a method discussed in Japanese Patent No. 2541688. The human face detection processing is not limited to any particular method.

By the human face detection processing, the image sensing unit 203 can acquire the number of human faces and the coordinate positions of the faces from each input image. Once the coordinate positions of the faces are known, the image sensing unit 203 can analyze the feature amounts of face areas. For example, the image sensing unit 203 can determine average Y, Cb, and Cr values of pixels included in the face areas to acquire the average luminance and average color difference of each area.

The image sensing unit 203 can also perform scene analysis processing by using feature amounts of an image. For example, the image sensing unit 203 can perform scene analysis processing by using methods discussed in Japanese Patent Application Laid-Open No. 2010-251999 and Japanese Patent Application Laid-Open No. 2010-273144. By the scene analysis processing, the image sensing unit 203 can acquire identifiers (IDs) for identifying captured scenes, including landscape, nightscape, person (portrait), underexposure, and others.

In the present exemplary embodiment, the image sensing unit 203 acquires sensing information by the foregoing sensing processing. However, the image sensing unit 203 may use different sensing information.

The image sensing unit 203 stores the sensing information acquired as described above into the database unit 202. As for a storage format of the database unit 202, the image sensing unit 203 may describe and store the sensing information in a general-purpose format as illustrated in FIG. 9 (for example, extensible markup language (XML)).

FIG. 9 illustrates an example where attribute information about each image is described in three separate categories.

The first category, tagged as "BaseInfo", is intended to store information attached to an acquired image file in advance, like an image size and photographing time information. Examples of such information include an identifier ID of each image, a storage location where the image file is stored, an image size, and photographing date and time.

The second category, tagged as "SensInfo", is intended to store results of the foregoing image analysis processing. An average luminance, an average saturation, an average hue of the entire image, and a result of scene analysis are stored. Information about face positions and face color of persons in the image and also stored.

The third category, tagged as "UserInfo", is a tag that can store information the user has input image by image. The UserInfo tag will be described in detail below.

The method for storing the image attribute information into the database unit 202 is not limited to the foregoing. Such information may be stored in any other known format.

In step S305 of FIG. 3, the image sensing unit 203 determines whether the image on which the foregoing processing of steps S302 and S303 has been performed is the last one. If the image is the last one (YES in step S305), the image sensing unit 203 proceeds to step S306. If the image is not the last one (NO in step S305), the image sensing unit 203 returns to step S302.

In step S306, the image sensing unit 203 performs processing for generating groups person by person by using face position information detected in step S303. Automatically grouping human faces in advance can make the user's subsequent operation for naming persons more efficient.

Here, the image sensing unit 203 generates person groups by using a known individual recognition method according to the processing flow of FIG. 5.

Note that individual recognition processing is mostly performed by extracting feature amounts of facial organs such as eyes and a mouth, and comparing degrees of similarity of relationship between such feature amounts. An example of the individual recognition processing is discussed in Japanese Patent No. 3469031. A detailed description thereof will thus be omitted.

FIG. 5 is a basic flowchart of person group generation processing in step S306.

In step S501, the image sensing unit 203 reads an image stored in the secondary storage device 103 in order and performs decoding processing. In step S502, the image sensing unit 203 accesses the database unit 202 to acquire the number of faces included in the image and position information about a face. In step S504, the image sensing unit 203 generates a normalized face image for performing the individual recognition processing.

An image may include faces of various sizes, orientations, and resolutions. Normalized face images refer to face images that are transformed and cut out to a predetermined size and orientation. For the purpose of individual recognition, the positions of organs such as eyes and a mouth are important. Normalized face images therefore desirably have a size such that the foregoing organs can be reliably recognized. The generation of such normalized face images eliminates the need to handle faces of various resolutions during feature amount detection processing.

In step S505, the image sensing unit 203 calculates a face feature information such as a face feature amount from the normalized face image. As employed herein, a face feature amount characteristically includes the positions and sizes of organs such as eyes, a mouth, and a nose, and the outline of the face.

In step S506, the image sensing unit 203 determines whether the calculated face feature amount is similar to face feature amounts stored in a database (hereinafter, referred to as a face dictionary) in which face feature amounts are stored with respect to each person's identifier (dictionary ID) in advance. For example, the image sensing unit 203 compares a feature amount managed in the face dictionary with the new input feature amount to calculate a degree of similarity. The feature amounts to be used here include stored information about the positions of organs such as eyes, a nose, and a mouth, and distances between the organs. The more similar the foregoing feature amounts are, the higher the value of the degree of similarity is. The less similar the foregoing feature amounts are, the lower the value the degree of similarity. For example, possible values of the degree of similarity are 0 to 100. The image sensing unit 203 determines whether the face feature amounts are similar by comparing the calculated degree of similarity with a threshold retained in advance. If the degree of similarity is higher than the threshold (YES in step S506), the image sensing unit 203 determines that the person is the same person as the one having the dictionary ID. If the degree of similarity is lower than or equal to the threshold (NO in step S506), the image sensing unit 203 determines that the person is not the same person. A single fixed threshold for such a similarity degree determination may be retained for all the dictionary IDs. Different thresholds may be retained for respective dictionary IDs.

If YES in step S506, the image sensing unit 203 proceeds to step S509. In step S509, determining that the person is the same person, the image sensing unit 203 adds the face feature amount to the face dictionary with the dictionary ID of the same person.

If NO in step S506, the image sensing unit 203 proceeds to step S508. In step S508, determining that the face under evaluation is of a person different from those who have been registered in the face dictionary, the image sensing unit 203 issues a new dictionary ID and adds the face feature amount to the face dictionary. The image sensing unit 203 applies the processing of steps S502 to S509 to all face areas detected from the input image group, thereby grouping persons who have appeared.

The image sensing unit 203 writes the result of the person group generation processing face by face by using ID tags as illustrated by an XML format of FIG. 12, and stores the resultant into the database.

In the exemplary embodiment described above, the image sensing unit 203 performs the person group generation processing after the end of the sensing processing of all the images as illustrated in FIG. 3. However, other methods may be employed. For example, as illustrated in FIG. 4, the image sensing unit 203 may repeat performing the sensing processing on an image in step S403 and then performing the person group generation processing in step S405 by using face detection position information. This can produce the same result.

Figure 7:
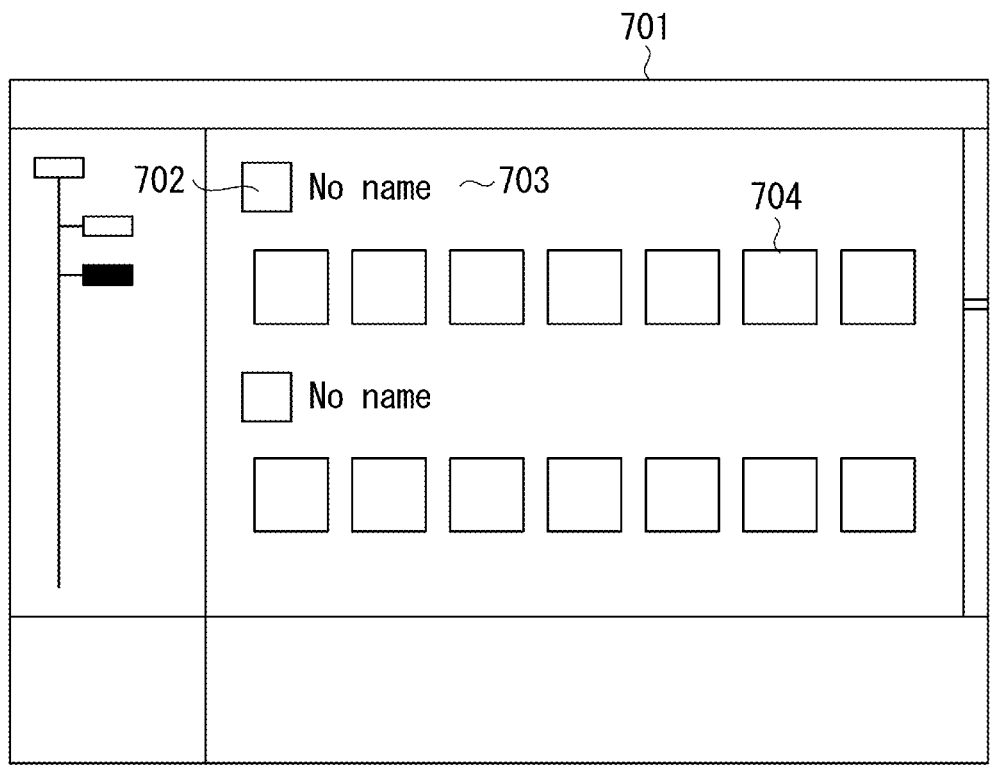
FIG. 7 illustrates a display example of person groups of the first exemplary embodiment.

FIG. 7 illustrates a UI 701 which displays the person groups obtained by the person group generation processing. In FIG. 7, a representative face image 702 of a person group is displayed next to an area 703 where a name of the person group is displayed. Immediately after the end of automatic person group generation processing, person names such as "No name1" and "No name2" are displayed as illustrated in FIG. 7. Hereinafter, such person names will be referred to as person IDs. A plurality of face images 704 is included in the person group. As will be described below, the UI 701 of FIG. 7 enables the user to designate an area 703 of "No name X" and input a person name, and/or input information such as a birthday and relationship person by person.

The image sensing unit 203 may perform the foregoing sensing processing by utilizing a background task of an operating system. In such a case, the image sensing unit 203 can continue the sensing processing of an image group or groups while the user performs other operations on the computer.

In the present exemplary embodiment, the user can manually input various types of attribute information about images.

Table 2 lists examples of such attribute information (hereinafter, referred to as manual registration information).

Manual registration information is broadly classified into two categories: information to be set in units of images and information to be set for persons grouped by the foregoing person group generation processing.

TABLE 2

Examples of Attribute Information User Can Manually Input

| Category | Item | Data type | Value |
|---|---|---|---|
| Image | Satisfaction rating | int | 0 to 5 |
|  | Event | char | "travel" "graduation" "wedding" |
| Person | Name | char | "NAME" |
|  | Birthday | char | YYYYMMDD |
|  | Relationship | char | "family" "" |

Figure 10A:
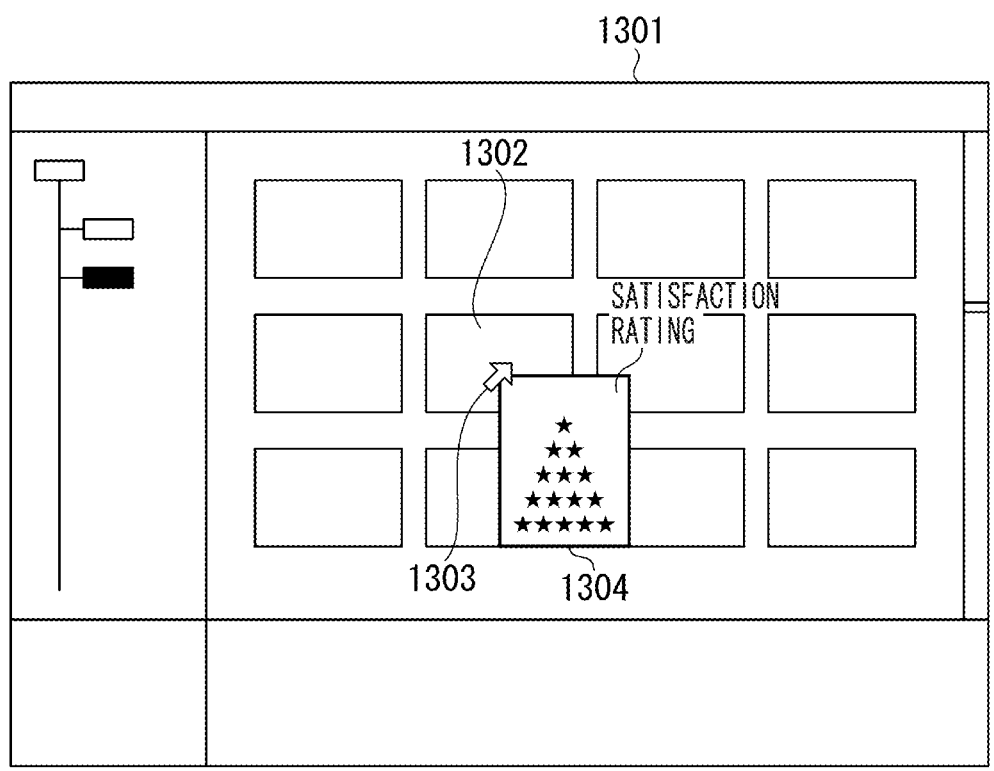
FIGS. 10A and 10B illustrate an example of a UI for manually inputting a satisfaction rating and an example of a user interface (UI) for manually inputting event information.

An example of the attribute information set image by image is the user's satisfaction rating. The satisfaction rating enables the user to manually input whether he/she likes the image in a stepwise fashion. For example, as illustrated in FIG. 10A, the user selects a desired thumbnail image 1302 on a UI 1301 by using a mouse pointer 1303, and right-clicks to display a dialog that enables input of the satisfaction rating. The user can select the number of stars on the menu according to the his/her preference. In the present exemplary embodiment, the higher the satisfaction rating, the greater the number of stars the user sets.

The image sensing unit 203 may automatically set satisfaction ratings without the user's manual setting. For example, suppose that the user clicks on a desired image file in the state of a list view of image thumbnails illustrated in FIG. 8A to enter a single image display screen. The image sensing unit 203 may count the number of times of such screen transitions and set the satisfaction rating according to the number. For example, the more frequently an image is viewed, the more the image is determined to be favored by the user.

In another example, the image sensing unit 203 may use the number of times of printing as a satisfaction rating. For example, when the user prints an image, the image sensing unit 203 may set the satisfaction rating of the image to be high, considering that the user likes the image. In such a case, the image sensing unit 203 counts the number of times of printing, and sets the satisfaction rating according to the number of times of printing.

As has been described above, the user may manually set a satisfaction rating. The image sensing unit 203 may set a satisfaction rating according to the number of views or according to the number of times of printing. By using an XML format as illustrated in FIG. 9, the image sensing unit 203 separately stores such settings and measured information into an UserInfo tag in the database unit 202. For example, the image sensing unit 203 stores the satisfaction rating with a FavoriteRate tag, the number of views with a ViewingTimes tag, and the number of times of printing with a PrintingTimes tag.

Another example of the information set image by image is event information. Examples of event information include a family trip "travel," a commencement or continuation ceremony "graduation," and a wedding ceremony "wedding."

Figure 10B:
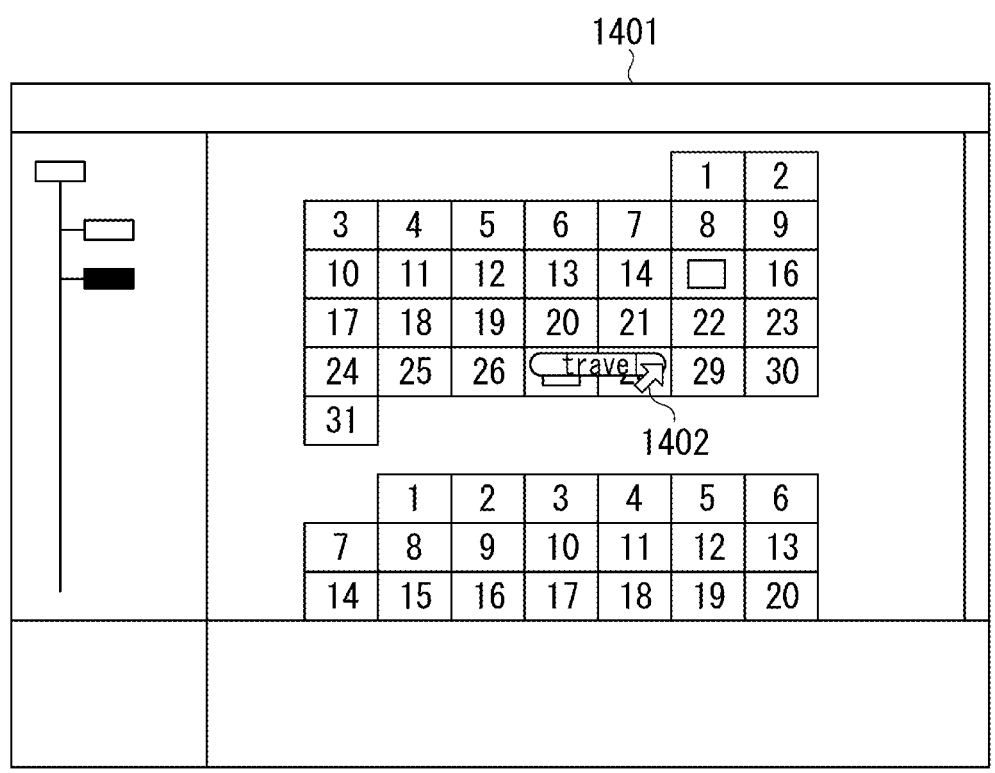

As illustrated in FIG. 10B, the user may specify an event by designating a desired date on a calendar by using a mouse pointer 1402 and inputting an event name of that date. The specified event name is included in the XML format illustrated in FIG. 9 as a part of the attribute information about the image. In the XML format of FIG. 9, an Event tag in the UserInfo tag is used to tie the event name and the image. Hereinafter, "to tie" means to associate.

Next, attribute information about a person will be described.

Figure 11:
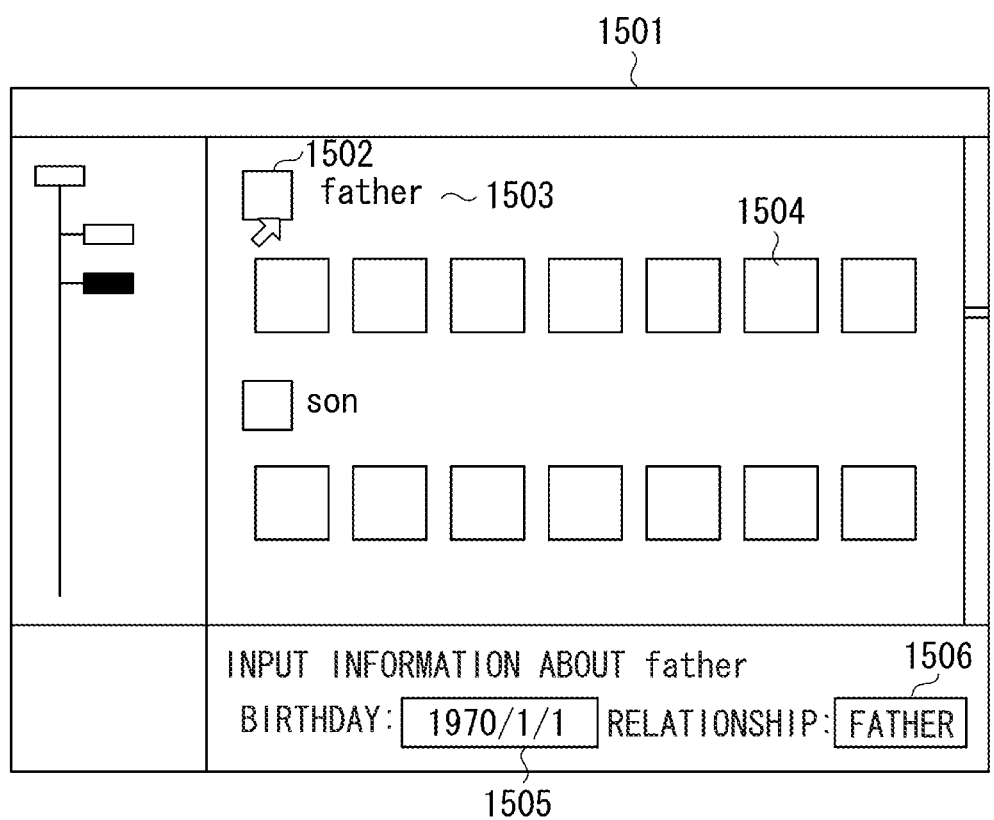
FIG. 11 illustrates an example of a UI for manually inputting person attribute information.

FIG. 11 illustrates a UI for inputting attribute information about a person. In FIG. 11, a representative face image 1502 of a given person (in this case, "father") is displayed next to a display area 1503 of a person name (person ID) of the given person. Images (thumbnails) 1504 are ones that are detected from other images and determined to have similar face feature amounts in step S506. In FIG. 11, the images 1504 determined to have similar face feature amounts in step S506 are displayed in a list form under the person ID 1503.

Immediately after the end of the sensing processing, as illustrated in FIG. 7, the person groups have no name input. The user can designate a "No name" portion 703 with a mouse pointer to input an arbitrary person name.

Each person's birthday and relationship to the user who operates the application may be set as attribute information about the person. The user can click a representative face image 1502 of a person in FIG. 11 to input the birthday of the clicked person in a first input section 1505 as illustrated at the bottom of the screen. The user can also input relationship information about the clicked person in a second input section 1506.

Unlike the foregoing attribute information associated with images, such input person attribute information is managed in the database unit 202 separately from the image attribute information by using an XML format as illustrated in FIG. 12.

Figure 13:
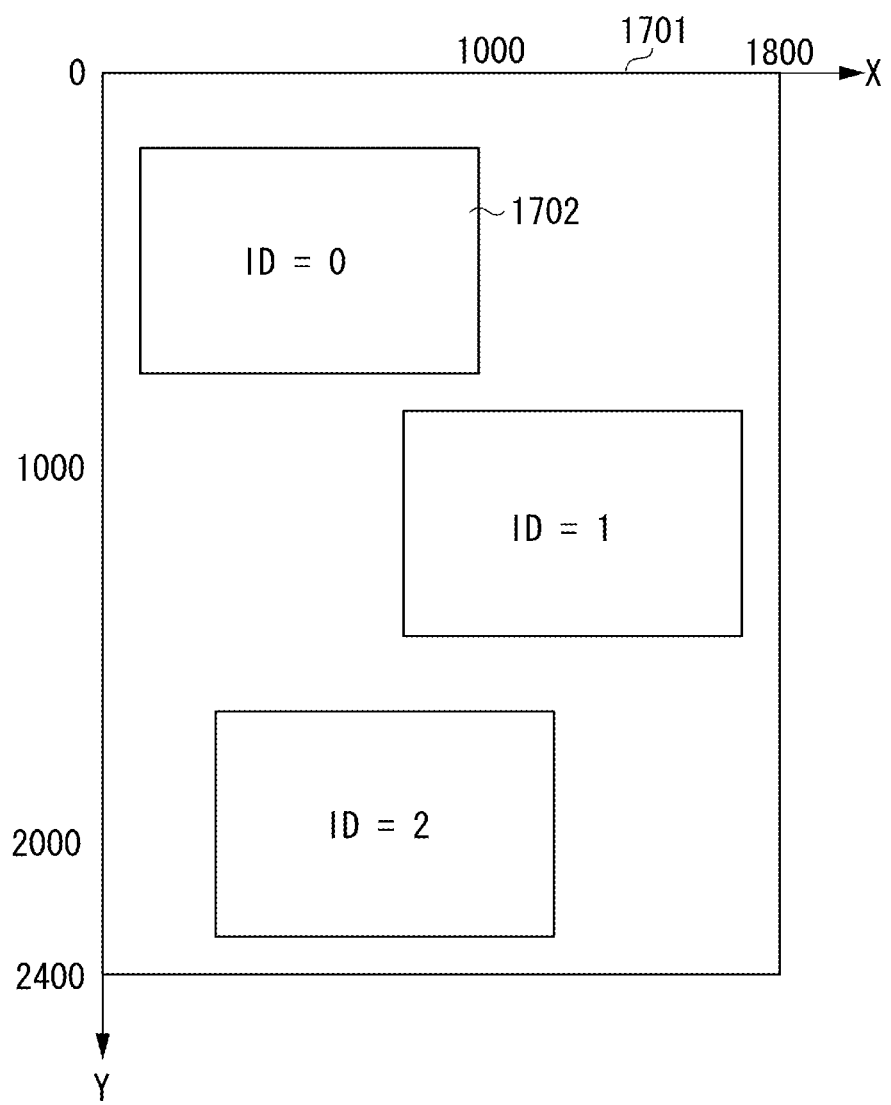
FIG. 13 illustrates an example of a layout template.
Figure 15:
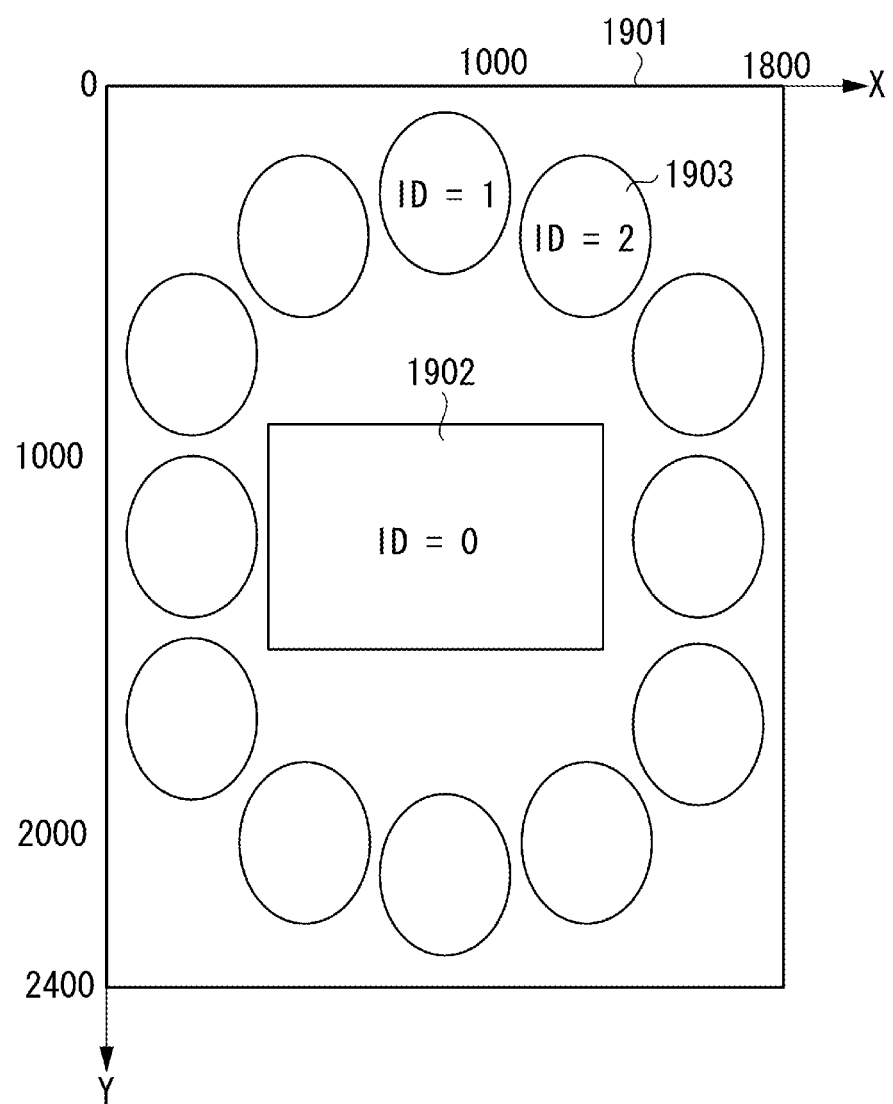
FIG. 15 illustrates an example of a layout template.

In the present exemplary embodiment, the layout generation unit 205 performs layout generation processing by using various layout templates prepared in advance. Layout templates refer to ones such as illustrated in FIGS. 13 and 15. A layout template includes a plurality of image layout areas, or equivalently, image layout frames (hereinafter, synonymous with slots) 1702, 1902, and/or 1903 within a layout sheet size.

There are prepared a large number of such templates. The templates may be stored in the secondary storage device 103 in advance when software for implementing the present exemplary embodiment is installed on the information processing apparatus 115. Alternatively, the layout generation unit 205 may acquire an arbitrary template group from the external server 114 located on the Internet connected via the IF 107 and/or the wireless LAN 109.

The templates may be written in a highly-versatile structured language. Examples include XML which is used to store the foregoing sensing results. FIGS. 14 and 16 illustrate examples of XML data.

In such examples, basic information about a layout page is written with a BASIC tag. Examples of the basic information include the layout's theme, page size, and page resolution (dpi). In the examples, a Theme tag, which describes a layout theme, is blank when the templates are in an initial state. A page size of A4 and a resolution of 300 dpi are set as basic information.

ImageSlot tags describe information about the foregoing image layout frames. An ImageSlot tag contains two tags, namely, an ID tag and a POSITION tag which describe an ID and position of an image layout frame. As illustrated in FIGS. 13 and 15, such position information is defined, for example, in an X-Y coordinate system with an origin at the top left.

The ImageSlot tags also set a slot shape and a recommended person group name to be arranged for the respective slots. For example, the layout template of FIG. 13 recommends that all slots have a rectangular shape "rectangle" as described by the Shape tags of FIG. 14, and a person group name "MainGroup" be arranged for all the slots as described by the PersonGroup tags.

As illustrated in FIG. 16, the layout template of FIG. 15 describes that a slot of ID=0 arranged in the center has a rectangular shape, with "SubGroup" as a person group. The other slots of ID=1, 2, . . . are recommended to have an "ellipse" shape with "MainGroup" as a person group each.

In the present exemplary embodiment, a large number of such templates are retained.

The application according to the present exemplary embodiment can perform analysis processing on input image groups, automatically group persons, and display the result on a UI. Viewing the result, the user can input attribute information such as a name and a birthday for each person group, and/or set a satisfaction rating for each image. The application can also retain a large number of layout templates classified by theme.

Satisfying the foregoing conditions, the application of the present exemplary embodiment performs, at predetermined timing, processing for automatically generating collage layouts that the user may like and presenting the collage layouts to the user (hereafter, referred to as layout suggestion processing).

FIG. 6 illustrates a basic flowchart for performing the layout suggestion processing.

In step S601, the scenario generation unit 204 determines a scenario of the layout suggestion processing. A scenario includes information about determination of a theme and a template of a layout to suggest, setting of a person (main character) to place emphasis on in the layout, and selection of image groups to be used for layout generation.

A method for determining a scenario will be described below in conjunction with two scenario examples.

Suppose, for example, that processing for suggesting a layout of a birthday of each person is set to be automatically performed two weeks before. Suppose also that the first birthday of a person who is automatically grouped as "son" in FIG. 11 is approaching. In such a case, the scenario generation unit 204 determines a theme of the layout to be a growth record "growth". The scenario generation unit 204 then selects a template. Here, the scenario generation unit 204 selects one suitable for a growth record like FIG. 15, and writes "growth" to the Theme tag portion of the XML as illustrated in FIG. 22. The scenario generation unit 204 then sets "son" as a main character "MainGroup" to place emphasis on during layout. The scenario generation unit 204 sets "son" and "father" as "SubGroup" to place a secondary emphasis on during layout. The scenario generation unit 204 then selects image groups to be used for layout. In the case of this example, the scenario generation unit 204 refers to the database unit 202, extracts a large number of image groups including "son" from image groups that have been captured since the birthday of the person "son," and generates a list of the extracted image groups. The scenario generation unit 204 thereby determines a scenario for a growth record layout.

As another example, suppose that the layout suggestion processing is set to be performed if predetermined event information has been registered within a month. If the event information registered in FIG. 10B shows that there was a family trip several days before and a large number of images of the family trip are stored in the secondary storage device 103, the scenario generation unit 204 determines a scenario for suggesting a layout of a family trip. In such a case, the scenario generation unit 204 determines a theme of the layout to be "travel." The scenario generation unit 204 then selects a template. In this case, the scenario generation unit 204 selects a layout like FIG. 13, and writes "travel" to the Theme tag portion of the XML as illustrated in FIG. 23. The scenario generation unit 204 then sets "son," "mother," and "father" as main characters "MainGroup" to place emphasis on during layout. By utilizing a characteristic of the XML, the scenario generation unit 204 can thus set a plurality of persons as "MainGroup." Next, the scenario generation unit 204 selects image groups to be used for layout. In the case of this example, the scenario generation unit 204 refers to the database unit 202, extracts a large number of image groups tied with the foregoing travel event, and generates a list of the extracted image groups. The scenario generation unit 204 thereby determines a scenario for a family trip layout.

In step S603 of FIG. 6, the layout generation unit 205 performs automatic layout generation processing based on the scenario described above. FIG. 17 illustrates a detailed processing flow of the layout generation unit 205. Referring to FIG. 17, the processing steps will be described below.

In step S2101, the layout generation unit 205 acquires template information that is determined by the foregoing scenario determination processing and includes the theme and person group information.

In step S2103, the layout generation unit 205 acquires feature amounts of images from the database unit 202 image by image to generate an image group attribute information list based on an image list determined by the scenario. As employed herein, the image group attribute information list includes an IMAGEINFO tag illustrated FIG. 9 as many as images included in the image list.

As can be seen, the automatic layout generation processing of the present exemplary embodiment will not directly handle image data itself, but uses the attribute information that has been stored in the database unit 202 by performing the sensing processing on each image in advance. The reason is to avoid needing an extremely large memory area for storing image groups when handling image data itself. As a result, the amount of memory needed for the automatic layout generation processing can be reduced.

Specifically, in step S2105, the layout generation unit 205 filters off unnecessary images in the input image groups by using the attribute information about the input image groups. The layout generation unit 205 performs the filtering processing on each image according to a flow of FIG. 18. In FIG. 18, in step S2201, the layout generation unit 205 initially determines whether an average luminance of the entire image is included in a range of certain thresholds (ThY_Low and ThY_High). If NO (NO in step S2201), the layout generation unit 205 proceeds to step S2206. In step S2206, the layout generation unit 205 excludes the image of interest from layout targets.

In steps S2202 to S2205, the layout generation unit 205 similarly determines whether an average luminance (AveY) and average color differences (AveCb and AveCr) of each face area included in the image of interest are included in ranges of predetermined thresholds that express favorable skin color areas. Only images that are determined to be YES in all of steps S2202 to S2205 are subjected to the subsequent layout generation processing. Specifically, in step S2202, the layout generation unit 205 determines whether AveY of a face area with an ID of N is included in a range of predetermined thresholds (ThfY_Low and ThfY_High).

In step S2203, the layout generation unit 205 determines whether AveCb of the face area with the ID of N is included in a range of predetermined thresholds (ThfCb_Low and ThfCb_High). In step S2204, the layout generation unit 205 determines whether AveCr of the face area with the ID of N is included in a range of predetermined thresholds (ThfCr_Low and ThfCr_High). In step S2205, the layout generation unit 205 determines whether the face area is of the last face. If the face area is not of the last face (NO in step S2205), the layout generation unit 205 returns to step S2202. If the face area is of the last face (YES in step S2205), the layout generation unit 205 ends the filtering processing.

Note that this filtering processing is intended to exclude images that can be determined to be obviously unnecessary in the subsequent temporary layout generation processing. The thresholds are therefore desirably set to be relatively mild. For example, in the determination of the average luminance of the entire image in step S2201, fewer images are determined to be YES if the difference between ThY_High and ThY_Low is extremely small as compared to a dynamic range of the images. To avoid such situations, the filtering processing of the present exemplary embodiment sets the thresholds such that the difference is set as large as possible and images determined to be obviously abnormal can be excluded.

In step S2107 of FIG. 17, the layout generation unit 205 generates a large number (L) of temporary layouts by using image groups determined to be the layout targets by the foregoing filtering processing. The layout generation unit 205 generates the temporary layouts by repeating processing for arbitrarily applying input images to image layout frames of the acquired template. For example, the layout generation unit 205 determines the following parameters (image selection, arrangement, and trimming) at random.

Figure 19A:
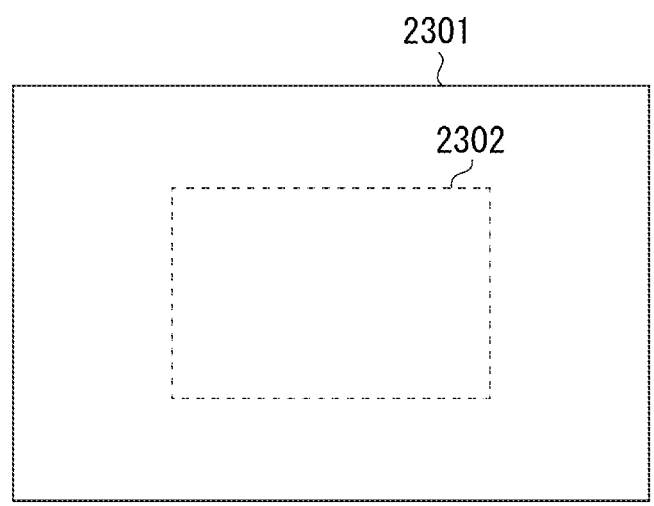
FIGS. 19A, 19B, and 19C illustrate automatic trimming processing, an explanatory diagram illustrating a method for calculating a brightness adequacy, and an explanatory diagram illustrating a method for calculating a saturation adequacy.

Examples of an image selection standard include which images to select from the image groups, given N image layout frames for layout. Examples of an arrangement standard include which image layout frames to arrange the selected plurality of images in. Examples of a trimming standard include a trimming ratio which indicates the degree of trimming processing to perform when arranging an image. For example, the trimming ratio is expressed as 0% to 100%. As illustrated in FIG. 19A, the layout generation unit 205 trims an image at a predetermined trimming ratio with respect to the center of the image. In FIG. 19A, an entire image 2301 is trimmed with a trimming frame 2302 at a trimming ratio of 50%.

Based on the foregoing image selection, arrangement, and trimming standards, the layout generation unit 205 generates temporary layouts as many as possible. Each of the generated temporary layouts can be expressed like an XML of FIG. 24. In each slot, an ID of the selected and arranged image is written with an ImageID tag, and the trimming ratio is written with a TrimmingRatio Tag.

The number L of temporary layouts to be generated here is determined according to the amount of processing of quantitative evaluations of the temporary layouts to be described below and the performance of the information processing apparatus 115 which performs the quantitative evaluations. For example, the layout generation unit 205 can generate more than several hundreds of thousands of temporary layouts.

The amount of processing of the quantitative evaluations varies depending on the degree of complexity of the layout template to generate. For example, the greater the number of slots handled in the layout template is, the greater the amount of processing of the quantitative evaluations is. The more complex the layout conditions specified for the respective slots are, the greater the amount of processing of the quantitative evaluations is. The information processing apparatus 115 may thus estimate the degree of complexity of the layout template to generate in advance and dynamically determine L according to the degree of complexity.

Appropriately setting L as described above can optimally control response at the time of automatic layout generation and the quality of layout results.

The layout generation unit 205 may add IDs to the respective generated temporary layouts and store the resultant into the secondary storage device 102 as files in the XML format of FIG. 24. The layout generation unit 205 may store the generated temporary layouts into the RAM 102 by using other data structures.

In step S2108 of FIG. 17, the layout generation unit 205 performs quantitative evaluations of the large number of temporary layouts generated. Specifically, the layout generation unit 205 evaluates each of the L generated temporary layouts by using predetermined layout evaluation amounts. Table 3 lists the layout evaluation amounts according to the present exemplary embodiment. As shown in Table 3, the layout evaluation amounts used in the present exemplary embodiment are mostly classified into three categories.

TABLE 3

Examples of Layout Evaluation Values for Automatic Layout

| Category | Evaluation amount | Score range | Degree of importance (weight W) by theme | |
|---|---|---|---|---|
| | | | growth | travel ... |
| Image-specific evaluations | Brightness adequacy | 0 to 100 | 0.5 | 1.0 |
| | Saturation adequacy | 0 to 100 | 0.5 | 1.0 |
| Image and slot matching degree evaluations | Degree of person matching | 0 to 100 | 1.0 | 0.5 |
| | Over trimming determination | 0 to 100 | 1.0 | 0.5 |
| In-page balance evaluations | Image similarity | 0 to 100 | 0.5 | 1.0 |
| | Color variations | 0 to 100 | 0.5 | 1.0 |
| | Face size variations | 0 to 100 | 0.5 | 1.0 |
| Others | User preference | 0 to 100 | 0.5 | 0.8 |

Figure 19B:
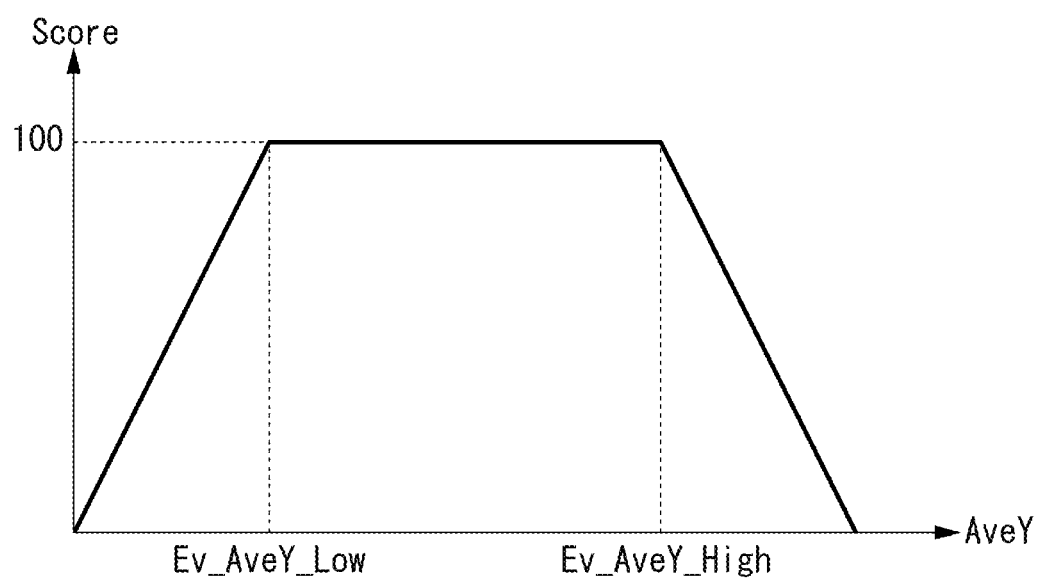
Figure 19C:
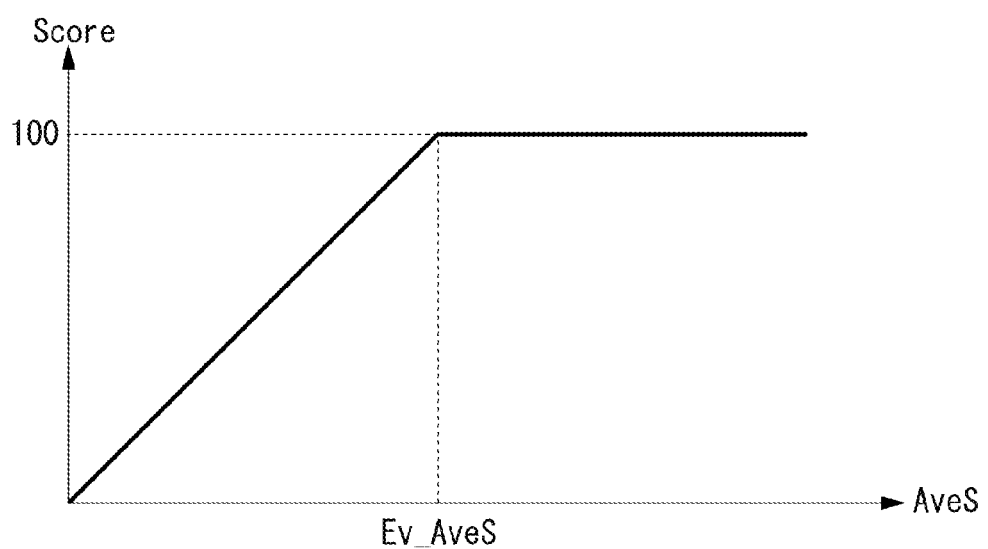

The first category includes image-specific evaluation amounts. The image-specific evaluation amounts are intended to determine and indicate the brightness, saturation, and the state of shakes and blur of an image in scores. Examples of the scores according to the present exemplary embodiment are described below. As illustrated in FIG. 19B, a brightness adequacy is set so that its score value is 100 when the average luminance of an entire image is in a certain range, and the score value decreases as the average luminance deviates from the range. As illustrated in FIG. 19C, a saturation adequacy is set so that its score value is 100 if the average saturation of the entire image is higher than a certain saturation value, and the score value decreases gradually as the average saturation becomes lower than the predetermined value.

Figure 20:
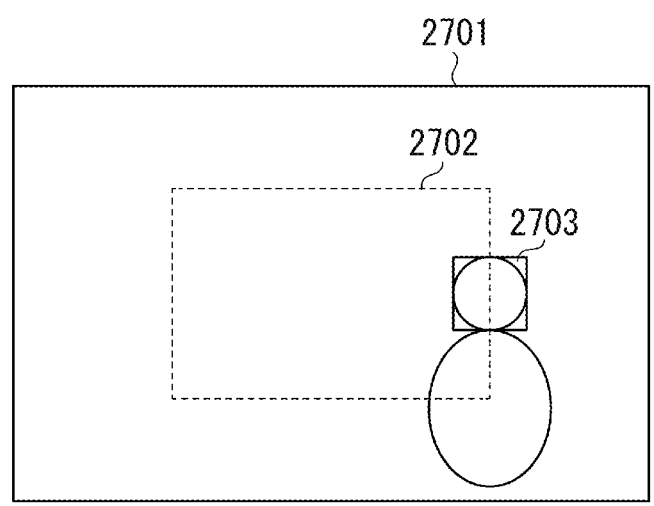
FIG. 20 illustrates over-trimming determination processing.

The second category includes evaluations about the degrees of matching of an image and a slot. Examples of the evaluations about the degrees of matching of an image and a slot include a degree of person matching and an over-trimming determination. The degree of person matching indicates a matching rate between a person or persons specified for a slot and a person or persons in the image actually arranged in the slot. For example, suppose that a slot is a person group specified by an XML, and "father" and "son" are designated for the slot. If an image assigned to the slot includes the two persons, the degree of person matching of the slot has a score value of 100. If the image includes either one of the persons, the degree of matching has a score value of 50. If the image includes neither of the persons, the score value is zero. For a degree of matching within a page, the layout generation unit 205 determines an average of the degrees of matching calculated for respective slots. For an over-trimming determination of a trimming area 2702, the layout generation unit 205 calculates a score value in the range of 0 to 100. For example, as illustrated in FIG. 20, if a position 2703 of a face in an image is known, the layout generation unit 205 calculates the score value according to the area of the trimmed portion. If the face area is not trimmed, the score is 100. On the other hand, if the entire face area is trimmed, the score value is zero.

The third category includes evaluations of balance within a layout page. Examples of evaluation values for evaluating balance include image similarity, variations of the distribution of pixel values, and object variations.

The image similarity serving as an evaluation amount for evaluating balance within a layout page will be described. The image similarity refers to the similarity of images within a layout page. The layout generation unit 205 calculates the similarity of images with respect to each of the large number of temporary layouts generated. For example, when generating a layout on a travel theme, it may not be a good layout to include only too similar images having high degrees of similarity. For example, the layout generation unit 205 can evaluate similarity based on the photographing date and time. Images having similar photographing dates and times are likely to have been captured in similar locations. Images having different photographing dates and times are likely to have been captured in different locations and on different scenes accordingly. As illustrated in FIG. 9, the layout generation unit 205 can acquire photographing dates and times from the attribute information about the images, stored as image attribute information in the database unit 202 in advance. The layout generation unit 205 performs the following calculation to determine the degree of similarity from the photographing dates and time. For example, suppose that four images listed in Table 4 are laid out on a temporary layout of interest.

The images are identified by image IDs. Photographing date and time information has been attached to each image. Specifically, the attached photographing date and time information includes a year, month, date, and time (year: YYYY, month: MM, date: DD, hour: HH, minute: MM, and second: SS). The layout generation unit 205 calculates a minimum photographing time interval among the four images.

TABLE 4

| Image ID | Photographing date and time (YYYYMMDD:HHMMSS) |
|---|---|
| 25 | 20100101:120000 |
| 86 | 20100101:150000 |
| 102 | 20100101:170000 |
| 108 | 20110101:173000 |

Here, the minimum interval is 30 minutes between the images having the image IDs of 102 and 108. The layout generation unit 205 stores this interval as MinInterval in units of seconds. Specifically, the minimum interval of 30 minutes is 1800 seconds. The layout generation unit 205 calculates MinInterval with respect to each of the L temporary layouts, and stores the MinInterval into an array stMinInterval[l]. The layout generation unit 205 determines a maximum value MaxMinInterval in stMinInterval[l]. The layout generation unit 205 then can determine an evaluation value of the degree of similarity of an l-th temporary layout, Similarity[l], by the following equation:

$$\text{Similarity}[l] = 100 \times \text{stMinInterval}[l] / \text{MaxMinInterval} \quad \text{Eq. 2}$$

The value of Similarity[l] approaches 100 as the minimum photographing time interval increases. The value of Similarity[l] approaches 0 as the minimum photographing time interval decreases. Similarity[l] is thus useful as an image similarity degree evaluation value.

Variations of the distribution of pixel values serving as an evaluation amount for evaluating the balance within a layout page will be described. In the following description, color variations will be described as an example of variations of the distribution of pixel values. For example, when generating a layout on a travel theme, it may not be a good layout to include only images of too similar colors (for example, blue of the blue sky or green of mountains). In such a case, layouts having greater color variations are highly evaluated. The layout generation unit 205 calculates a variance of the average hues AveH of images included in an l-th temporary layout of interest, and stores the variance as a degree of color variations tmpColorVariance[l]. The layout generation unit 205 determines a maximum value MaxColorVariance in tmpColorVariance[l]. The layout generation unit 205 then can determine an evaluation value of the degree of color variations of an l-th temporary layout, ColorVariance[l], by the following equation:

$$\text{ColorVariance}[l] = 100 \times \text{tmpColorVariance}[l] / \text{MaxColorVariance} \quad \text{Eq. 3}$$

The value of ColorVariance[l] approaches 100 as variations of the averages hues of the images arranged in a page increase. The value of ColorVariance[l] approaches 0 as the variations decrease. ColorVariance[l] can thus be used as an evaluation value of the distribution of color variations. Variations of the distribution of pixel values are not limited to the foregoing.

Object variations serving as an evaluation amount for evaluating the balance within a layout page will be described. Here, face size variations will be described as an example of object variations. For example, when generating a layout on a travel theme, it may not be a good layout to include only images of too similar face sizes. A good layout is considered to include large faces and small faces arranged in a favorable balance on a layout page. In such a case, layouts having large face size variations are highly evaluated. The layout generation unit 205 stores a variance value of the sizes of faces arranged on an l-th temporary layout of interest as tmpFaceVariance[l]. The size of a face refers to the diagonal distance from a top left to a bottom right of the face position. The layout generation unit 205 determines a maximum value MaxFaceVariance in tmpFaceVariance[l]. The layout generation unit 205 then can determine an evaluation value of the degree of face size variations of an l-th temporary layout, FaceVariance[l], by the following equation:

$$\text{FaceVariance}[l] = 100 \times \text{tmpFaceVariance}[l] / \text{MaxFaceVariance} \quad \text{Eq. 4}$$

The value of FaceVariance[l] approaches 100 as variations of the sizes of the faces arranged on a sheet increase. The value of FaceVariance[l] approaches 0 as the variations decrease. FaceVariance[l] can thus be used as an evaluation value of the degree of face size variations.

Object variations are not limited to the foregoing.

The others category may include the user's preference evaluations.

For example, even a layout that has low evaluation values in the foregoing various evaluation amounts may be a good one to the user if the layout includes the user's personal favorite pictures. In order not to inhibit such layouts from being selected, an evaluation amount based on the user's preference can be used for evaluation.

As described above, the user can set the satisfaction rating of each image in advance. The information processing apparatus 115 can thus evaluate the user's preference based on the satisfaction rating. Alternatively, for example, the information processing apparatus 115 may automatically evaluate the user's preference based on the number of views and/or the viewing time. Information to be used for such evaluations can be calculated from information managed by a FavoriteRate tag, a ViewingTimes tag, and a PrintingTimes tag.

For an l-th temporary layout, the information processing apparatus 115 determines average values FavoriteRateAve[l], VeiwingTimesAve[l], and PrintingTimesAve[l] of the values included in the respective tags of all the images arranged in the slots.

The information processing apparatus 115 then sums up the average values to determine the user's preference evaluation value UserFavor[l] by the following equation:

UserFavor[*l*]=FavoriteRateAve[*l*]+ViewingTimesAve[*l*]+PrintingTimesAve[*l*]  Eq. 4

The value of UserFavor[l] increases as the layout includes more images of which the user's satisfaction rating is higher, the number of views is greater, and/or the number of times of printing is greater. In the present exemplary embodiment, the higher the value of UserFavor[l], the higher the user's preference for the layout is determined to be.

The foregoing plurality of evaluation values calculated for each temporary layout will be referred to integrally as layout evaluation values of each temporary layout. A comprehensive evaluation value of an l-th temporary layout will be denoted by EvalLayout[l]. The N evaluation values calculated above (including the evaluations values of Table 3) will be denoted by EvalValue[n]. The layout generation unit 205 can determine the comprehensive evaluation value by the following equation:

$$EvalLayout[l] = \sum_{n=0}^{N} EvalValue[n] \times W[n] \quad \text{Eq. 5}$$

In the foregoing equation, W[n] is the weight of each evaluation value on each scene, listed in Table 3. Different weights are set for different layout themes. For example, compare the themes of a growth record "growth" and a trip "travel" listed in Table 3. On a travel theme, it is often desirable to lay out a large number of pictures having as high a quality as possible on various scenes. The weights are therefore set to place emphasis on the image-specific evaluation values and the in-pace balance evaluation values. In contact, for a growth record "growth", whether the main character of the growth record matches the slots without fail is often more important than image variations. The weights are thus set to place emphasis on the image and slot matching degree evaluations over the in-page balance and image-specific evaluations. In the present exemplary embodiment, the degrees of importance by theme are set as listed in Table 3.

In step S2109, by using EvalLayout[l] thus calculated, the layout generation unit 205 generates a layout list LayoutList[k] for displaying layout results. The layout list LayoutList[k] stores the identifiers l of a predetermined number (for example, five) of EvalLayout[l] having the highest evaluation values. For example, if the 50th temporary layout (l=50) scores the highest, LayoutList[0]=50. The layout generation unit 205 similarly stores the identifiers l of the temporary layouts having the second highest and subsequent score values into LayoutList[1] and later.

Figure 21:
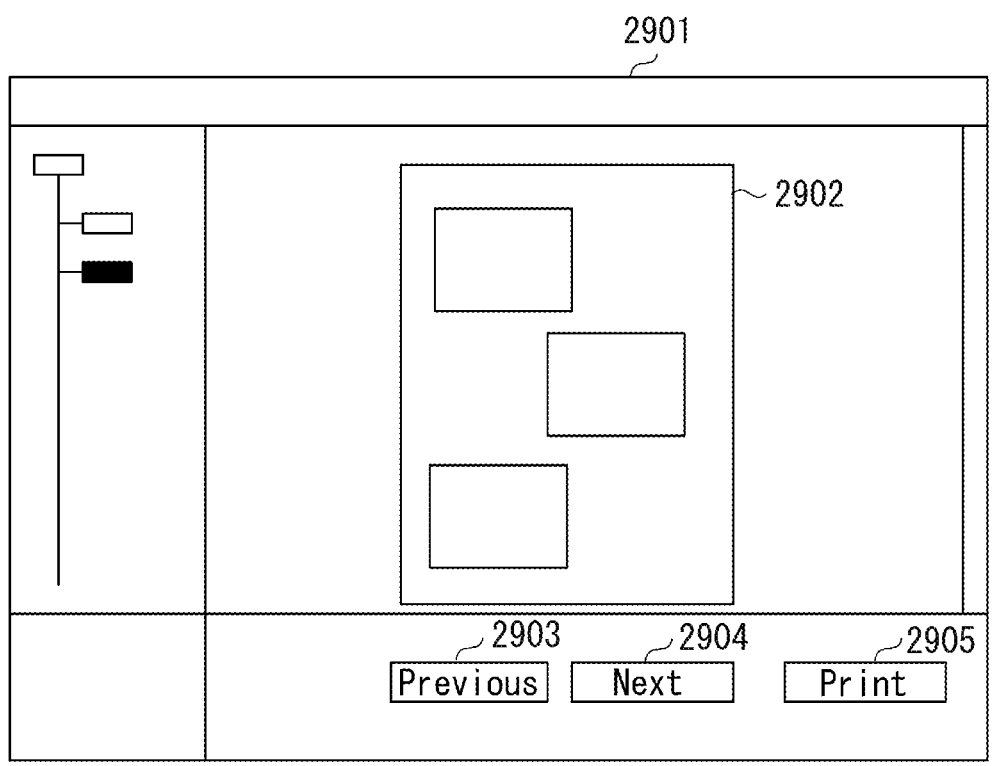
FIG. 21 illustrates a display example of a result of automatic layout generation according to the first exemplary embodiment.

Referring back to FIG. 6, in step S605, the rendering unit 206 renders a layout result obtained by the foregoing automatic layout generation processing, and displays the rendering result as illustrated in FIG. 21. In step S605, the rendering unit 206 initially reads the identifier l stored in LayoutList[0], and reads the temporary layout corresponding to the identifier l from the secondary storage device 103 or the RAM 102. As described above, the temporary layout includes template information and image IDs assigned to respective slots included in the template. Based on such information, the rendering unit 206 renders the temporary layout by using drawing functions of the operating system (OS) running on the information processing apparatus 115, and displays a layout result 2902 as illustrated in FIG. 21.

In FIG. 21, the user presses a next button 2904 to read the identifier l of LayoutList[1] having the second score. The rendering unit 206 performs rendering as described above, and displays the resultant. The user can thus view different variations of suggested layouts. The user can press a previous button 2903 to redisplay the previously displayed layout. If the user likes the displayed layout, the user can press a print button 2905 to print out the layout result 2902 from the printer 112 connected to the information processing apparatus 115.

In the present exemplary embodiment, the layout generation unit 205 uses the image groups prepared by the user to generate a large number of layout candidates (temporary layouts) including different variations of images selected from the image groups. Since the layout generation unit 205 generates such layout candidates without particularly limiting selection conditions in advance, layout results reflecting features of the image groups can be obtained. For example, given an image group of a trip with a lot of landscape images, the generated layout candidates include a lot of landscape images. Given an image group of an event where certain people appear frequently, the resulting layout candidates tend to include such people.

In the present exemplary embodiment, the layout generation unit 205 comprehensively evaluates the layout candidates generated as described above about the feature amounts of the respective arranged images and balance between the arranged images, and selects a predetermined number of layout lists (final layouts). In other words, in the present exemplary embodiment, the layout generation unit 205 comprehensively evaluates the generated layout candidates for image-specific evaluations and overall in-page evaluations, and selects favorable layout lists from the layout candidates. The layout generation unit 205 can thus select high-quality layouts in favorable overall alignment as layout products.

The effects of the present exemplary embodiment will be described in more detail below. In the present exemplary embodiment, layouts in favorable overall balance or alignment are more likely to be selected as compared to ones that are generated from a single point of view or following a single layout instruction. The reason is that if layouts are generated from a single point of view or following a single layout instruction, no layout deviating from the single point of view or layout instruction can be generated.

Features of a captured image group can usually vary greatly depending on the photographer. For example, an image group of the same "family trip" may include different numbers of captured images and have different distributions of the number of objects depending on whether the family is a relatively big, eight-member one including a grandfather and grandmother or a four-member one. Take the case of generating layouts by using a template. If the layout generation unit 205 applies an image group of a family of eight to a template targeted for a family of four, the generated layout results may not be favorable. More specifically, suppose that the template includes an instruction to "arrange a group photo here." The instructed location has an appropriate position and size for the arrangement of a group photo of four. If a group photo of eight is arranged in the instructed location, the faces may become too small to identify.

Templates have been generated on the assumption that there are image groups sufficient to satisfy the templates' instruction conditions. However, when generating layouts by using a template, actually-input image groups may not always satisfy such instruction conditions. Even if the input image groups deviate greatly from what the template expects, some arrangement of images needs to be determined. For example, images are selected and arranged from the image groups at random. In such a case, it is not possible to stably obtain satisfactory layout results.

In contrast, in the present exemplary embodiment, unlike the method for generating layouts by extracting an image group matching a predetermined template, the layout generation unit 205 selects image groups without particular limitations. The layout generation unit 205 can thus generate layouts according to the features of the image groups. After the generation of various patterns of layouts, the layout generation unit 205 comprehensively evaluates image-specific evaluations and in-page overall evaluations, and selects favorable layout lists from the layout candidates. The layout generation unit 205 can thus select high-quality layouts in favorable overall alignment as layout products.

According to the present exemplary embodiment, a large number of templates tailored to all kinds of image groups need not be prepared. This can reduce the load of generating layouts and the cost for storing templates.

As described above, according to the present exemplary embodiment, the information processing apparatus 115 can obtain high-quality layout results in favorable overall alignment as layout products while reflecting features of image groups. This increases the possibility of obtaining favorable layout results that are not able to be generated by a known layout generation method.

A second exemplary embodiment is similar to the first exemplary embodiment except the method for generating layout candidates. A redundant description will be omitted.

In the first exemplary embodiment, the layout generation unit 205 generates a large number of temporary layouts at a time, determines evaluations values thereof, and selects optimum layout candidates. In other words, in the first exemplary embodiment, the layout generation unit 205 generates and evaluates layout candidates at random. In the second exemplary embodiment, the layout generation unit 205 initially generates several layout candidates, and then generates better layout candidates through feedback of evaluations.

For example, in the present exemplary embodiment, the layout generation unit 205 optimizes combinations by using a "genetic algorithm" which includes crossing characteristics of highly-evaluated layout candidates to generate new layout candidates.

Specifically, the layout generation unit 205 initially generates 1000 layouts as "first generation," and evaluates the layouts. Based on the evaluations, the layout generation unit 205 crosses features of highly-evaluated layouts to generate "second-generation" layouts. The method for crossing features of layouts is not limited in particular. An example of the method may include creating layouts simply by preferentially reselecting image groups that are selected in the highly-evaluated layouts. For example, suppose that a layout X in which five images A, B, C, D, and E are selected and a layout Y in which five images G, H, I, J, and k are selected are highly evaluated among the first-generation layouts. In such a case, the layout generation unit 205 uses the images groups selected in the layouts X and Y and generates a layout, for example, in which the images A, B, C, G, and H are selected.

At the time of crossing, the layout generation unit 205 may introduce an element irrelevant to the highly-evaluated layouts at a certain probability to produce a mutation. This can prevent the next- and subsequent-generation layouts from being trapped in local solutions. For example, take the case of generating a second-generation layout from the layouts X and Y among the foregoing first-generation layouts. In such a case, the layout generation unit 205 introduces an image N not included in either of the layouts X and Y when crossing the layouts X and Y, thereby generating a layout in which the images A, B, G, H, and N are selected. The layout generation unit 205 can similarly generate third- and subsequent-generation layouts to develop generations for better layouts.

The layout generation unit 205 can similarly generate third- and subsequent-generation layouts to develop generations for better layouts.

According to the method described above, the layout generation unit 205 can develop 100 generations by a similar number of layout evaluations to when generating a hundred thousand layouts at random. In the present exemplary embodiment, the layout generation unit 205 selects highly-evaluated layouts from the 100th-generation layout results as final layout candidates.

As compared to the generation of a hundred thousand layouts at random, the generation of layouts by the foregoing method increases the possibility that a lot of layouts of favorable origins can be generated. This consequently increases the possibility that the layout generation unit 205 can obtain layout results close to optimum layouts.

The present exemplary embodiment deals with the case where the layout generation unit 205 evolves 1000 layouts for 100 generations. The most efficient number of variations of layouts to generate per generation depends on the degrees of freedom of possible combinations of the layouts.

The degrees of freedom of combinations will be described below. Factors that determine the degrees of freedom of combinations are broadly classified into characteristics of the layout template and characteristics of an arrangement candidate image group.

Examples of the characteristics of a layout template include the number of slots and arrangement conditions. As the number of slots included in the layout template increases, arrangement variations of the same image group increase according to combinations (permutations) of the slots. For example, if a layout template has three slots, three images A, B, and C can be arranged in 3! (factorial of 3)=6 permutations. If a layout template has four slots, four images A, B, C, and D can be arranged in 4! (factorial of 4)=24 permutations. Similarly, a layout template with n slots has n! (factorial of n) variations. In such a manner, the greater the number of slots is, the greater the degrees of freedom of combinations (permutations) are. Given a layout template with the same number of slots, the degrees of freedom of images to match the layout template itself increase as the degrees of freedom of the arrangement condition specified for each slot increase.

Examples of the characteristics of an arrangement candidate image group include the number of images and possible values of the sensing results of each image. The greater the number of images, the more the possible combinations of the images are. Given the same number of images, the layout evaluation amounts calculated from a selected combination of images are expected to vary more largely as possible values of the sensing results of each image vary more widely. In other words, the range of variations of images in the arrangement candidate image group directly affects the degrees of freedom of layout variations.

For example, if the number of slots and the number of arrangement candidate images are large, the layout generation unit 205 may experimentally generate a considerable number of layout candidates in the first generation to examine the tendency of favorable layouts. Then, the layout generation unit 205 may gradually reduce the number of layout candidates.

When the layout generation unit 205 applies a genetic algorithm to optimize combinations with arbitrary degrees of freedom, the efficient numbers of layouts to generate in respective generations may be set by using known techniques in appropriate combinations.

In the present exemplary embodiment, the layout generation unit 205 uses a genetic algorithm to optimize combinations. However, this is not restrictive. The layout generation unit 205 may generate more favorable layout results by a limited number of attempts by applying a known method effective for combination optimization. The layout generation unit 205 may evaluate the quality of layouts by using evaluation functions similar to those described in the first exemplary embodiment. Evaluation functions for comprehensively evaluating evaluations from various viewpoints can be used. The layout generation unit 205 can thus select favorable layouts as in the first exemplary embodiment.

The layout generation unit 205 can repeat such feedback evaluations to efficiently generate appropriate layouts.

The foregoing exemplary embodiments are a unit for obtaining the effects of an exemplary embodiment of the present invention, and similar other techniques and/or different parameters may be used without departing from the scope of an exemplary embodiment of the present invention as far as similar effects to those of an exemplary embodiment of the present invention are obtained.

The foregoing exemplary embodiments have been described by using persons as examples of objects. However, objects are not limited to persons. Recognition processing of pets such as dogs and cats may be performed to recognize and set the pets as objects. Buildings and small articles can be recognized by performing recognition processing on edge-detected shapes. Buildings and small articles therefore can also be set as objects. In such cases, image processing can be performed in the same way as in the foregoing exemplary embodiments by extracting feature amounts of the objects and registering the extracted feature amounts into a dictionary.

In the foregoing exemplary embodiments, the layout generation unit 205 numerically determines the degree of similarity between images to evaluate the similarity between the images. However, the evaluation of the similarity between images is not limited thereto.

The foregoing exemplary embodiments have dealt with the cases of generating a single page of output product on which a plurality of images is arranged as a layout output product. However, an exemplary embodiment of the present invention may be applied to an album output of a plurality of pages.

According to an exemplary embodiment of the present invention, it is possible to obtain high-quality layout results in favorable overall alignment as layout products while reflecting features of image groups. According to an exemplary embodiment of present invention, the possibility of obtaining a more favorable layout result improves as compared to conventional methods.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

All the foregoing processing need not be implemented by software. A part or all of the processing may be implemented by hardware.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-153781 filed Jul. 9, 2012, which is hereby incorporated by reference herein in its entirety.

What is claimed is:

1. An apparatus comprising:
   one or more memories;
   one or more processors in communication with the one or more memories, the one or more processors being configured to control;
   an acquisition unit configured to acquire an image data group including a plurality of images;
   a generation unit configured to generate a plurality of layout candidates for one page, each of the layout candidates being generated by selecting one or more images from the plurality of images and by executing a process for arranging, in a template, the selected images;

an evaluation unit configured to evaluate the generated layout candidates for the one page, for each of the generated layout candidates, based on an image-specific evaluation of each image arranged in each of the generated layout candidates and an in-page balance evaluation within each of the generated layout candidates, wherein the each of the generated layout candidates is layout information that the process for arranging, in the template, the selected images, has been executed; and a determination unit configured to determine a layout for the one page to be output from the plurality of layout candidates for the one page based on a result of evaluation by the evaluation unit.

2. The apparatus according to claim 1, wherein the evaluation unit evaluates the generated layout candidates for the one page, for each of the generated layout candidates, based on the image-specific evaluation, the balance evaluation and an evaluation of matching degree of the images to slots.

3. The apparatus according to claim 1, wherein the evaluation unit is configured to change weights of the image-specific evaluation and the balance evaluation according to a theme of the layout to be output.

4. The apparatus according to claim 1, wherein the acquisition unit comprises a filtering unit configured to evaluate whether each image satisfies a predetermined standard and to not acquire an image that does not satisfy the predetermined standard.

5. The apparatus according to claim 1, wherein the evaluation unit is configured to perform the evaluation such that the balance evaluation becomes higher as image similarity between the images arranged in the generated layout candidate decreases.

6. The apparatus according to claim 1, further comprising a second acquisition unit configured to acquire a template including a plurality of image layout areas, wherein the generation unit is configured to generate each layout candidate by automatically selecting one or more images from the plurality of images and arranging the selected images in the acquired template.

7. The apparatus according to claim 1, wherein the generation unit is configured to change layout candidates to be generated as (n+1)-th layout candidates according to a result of evaluation by the evaluation unit of the layout candidates generated as n-th layout candidates (n being a natural number).

8. The apparatus according to claim 1, wherein the image-specific evaluation includes at least one of a brightness of an image, a saturation of an image, and a state of an image.

9. The apparatus according to claim 1, wherein the evaluation unit is configured to perform the evaluation such that the balance evaluation becomes higher as variations of a distribution of colors of the images arranged in the generated layout candidates become greater.

10. The apparatus according to claim 1, wherein the evaluation unit is configured to perform the evaluation such that the balance evaluation becomes higher as variations of objects of the images arranged in the generated layout candidates become greater.

11. The apparatus according to claim 1, wherein each of the layout candidates for the one page includes a different combination of images.

12. A method comprising:
acquiring an image data group including a plurality of images;

generating a plurality of layout candidates for one page, each of the layout candidates being generated by selecting one or more images from the plurality of images and by executing a process for arranging, in a template, the selected images;

evaluating the generated layout candidates, for each of the generated layout candidates for the one page based on an image specific evaluation of each image arranged in the each of the generated layout candidates and an in-page balance evaluation within each of the generated layout candidates, wherein the each of the generated layout candidates is layout information that the process for arranging the selected images in the template has been executed; and determining a layout for the one page to be output from the plurality of layout candidates for the one page based on a result of evaluation.

13. The method according to claim 12, wherein the generated layout candidates are evaluated, for each of the generated layout candidates for the one page, based on the image-specific evaluation, the balance evaluation and an evaluation of matching degree of the images to slots.

14. The method according to claim 12, wherein, in the evaluating, weights of the image-specific evaluation and the balance evaluation are changed according to a theme of the layout to be output.

15. The method according to claim 12, wherein, in the acquiring, whether each image satisfies a predetermined standard is evaluated, and an image that does not satisfy the predetermined standard is not acquired.

16. The method according to claim 12, wherein, in the evaluating, the evaluation is performed such that the balance evaluation becomes higher as image similarity between the images arranged in the generated layout candidate decreases.

17. The method according to claim 12, further comprising acquiring a template including a plurality of image layout areas, wherein, in the generating, the each layout candidate is generated by automatically selecting one or more images from the plurality of images and arranging the selected images in the acquired template.

18. The method according to claim 12, wherein, in the evaluating, the evaluation is performed such that the balance evaluation becomes higher as variations of a distribution of colors of the images arranged in the generated layout candidates become greater.

19. The method according to claim 12, wherein, in the evaluating, the evaluation is performed such that the balance evaluation becomes higher as variations of objects of the images arranged in the generated layout candidates become greater.

20. The method according to claim 12, wherein, each of the layout candidates for the one page includes a different combination of images.

21. A non-transitory computer-readable recording medium that causes a computer to perform a method, the method comprising;

acquiring an image data group including a plurality of images;

generating a plurality of layout candidates for one page, each of the layout candidates being generated by selecting one or more images from the plurality of images and by executing a process for arranging, in a template, the selected images;

evaluating the generated layout candidates, for each of the generated layout candidates for the one page based on an image specific evaluation of each image arranged in the each of the generated layout candidates and an in-page balance evaluation within each of the generated layout candidates, wherein the each of the generated layout candidates is layout information that the process for arranging the selected images in the template has been executed; and determining a layout for the one page to be output from the plurality of layout candidates for the one page based on a result of evaluation.

* * * * *